(12) United States Patent
Conner et al.

(10) Patent No.: US 6,832,730 B2
(45) Date of Patent: Dec. 21, 2004

(54) SMART CARD WITH ROTATING STORAGE

(75) Inventors: Finis Conner, Carmel, CA (US); Anil Nigam, Saratoga, CA (US)

(73) Assignee: StorCard, Inc., Carmel, CA (US)

( * ) Notice: Subject to any disclaimer, the term of this patent is extended or adjusted under 35 U.S.C. 154(b) by 0 days.

(21) Appl. No.: 10/194,132

(22) Filed: Jul. 11, 2002

(65) Prior Publication Data

US 2003/0024995 A1 Feb. 6, 2003

Related U.S. Application Data

(60) Provisional application No. 60/308,172, filed on Jul. 27, 2001.

(51) Int. Cl.[7] .............................................. G06K 19/00
(52) U.S. Cl. ....................................... 235/487; 235/492
(58) Field of Search ............................ 235/380, 375, 235/487, 492

(56) References Cited

U.S. PATENT DOCUMENTS

| 4,868,373 | A |   | 9/1989  | Opheij            |         |
|-----------|---|---|---------|-------------------|---------|
| 5,375,037 | A |   | 12/1994 | Le Roux           |         |
| 5,486,687 | A |   | 1/1996  | Le Roux           |         |
| 5,546,250 | A |   | 8/1996  | Diel              |         |
| 5,679,007 | A |   | 10/1997 | Potdevin et al.   |         |
| 5,760,998 | A |   | 6/1998  | Berberrich et al. |         |
| 5,771,143 | A |   | 6/1998  | Vernois           |         |
| 5,936,226 | A | * | 8/1999  | Aucsmith          | 235/492 |
| 6,147,837 | A |   | 11/2000 | Schick et al.     |         |

FOREIGN PATENT DOCUMENTS

| DE | 19541306 A1   | 5/1996 |
| DE | 19943092 A1   | 3/2001 |
| EP | 0266101 A1    | 5/1988 |
| WO | WO97/21219 A1 | 6/1997 |
| WO | WO01/04905 A1 | 1/2001 |

* cited by examiner

*Primary Examiner*—Karl D. Frech
(74) *Attorney, Agent, or Firm*—Townsend and Townsend and Crew LLP

(57) ABSTRACT

A credit card-sized card having a rotating magnetic memory therein is disclosed. The card is provided using a laminated structure in which a stainless steel, plastic sandwich structure is employed. An opening in the plastic layer provides space for the rotating magnetic disk. Data is written to or read from the disk by positioning heads from an external system into openings in the external surface of the card. When the card is not engaged in a reader, a shutter covers the openings.

37 Claims, 19 Drawing Sheets

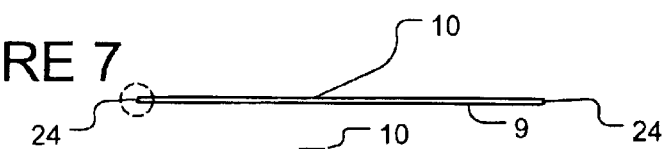
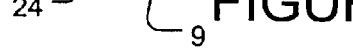
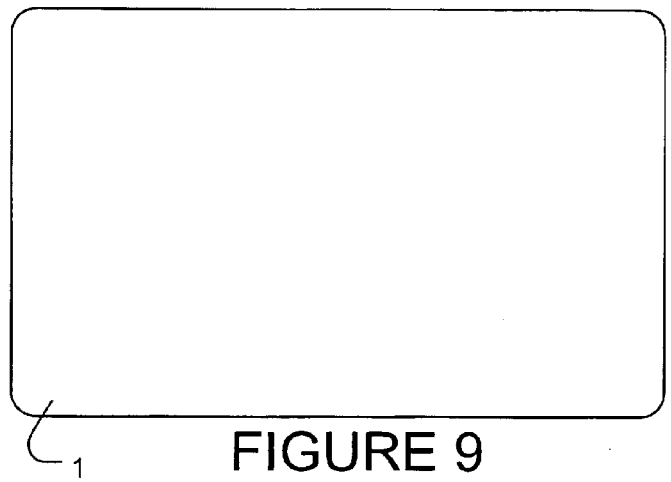
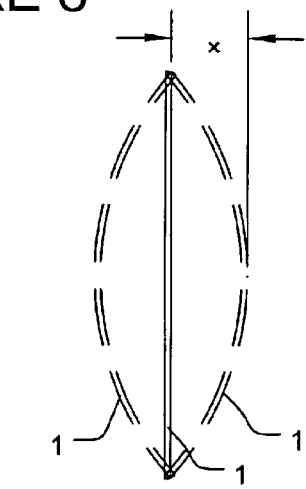
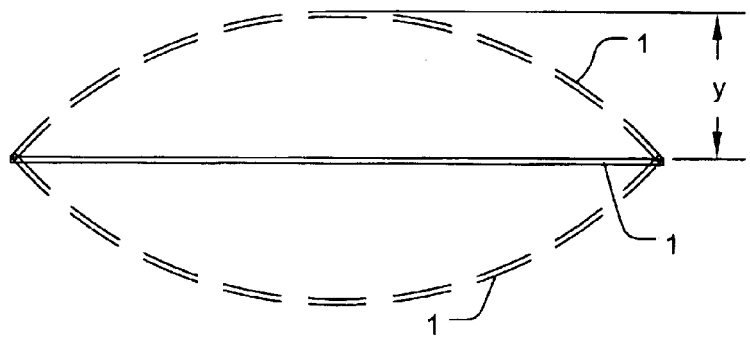

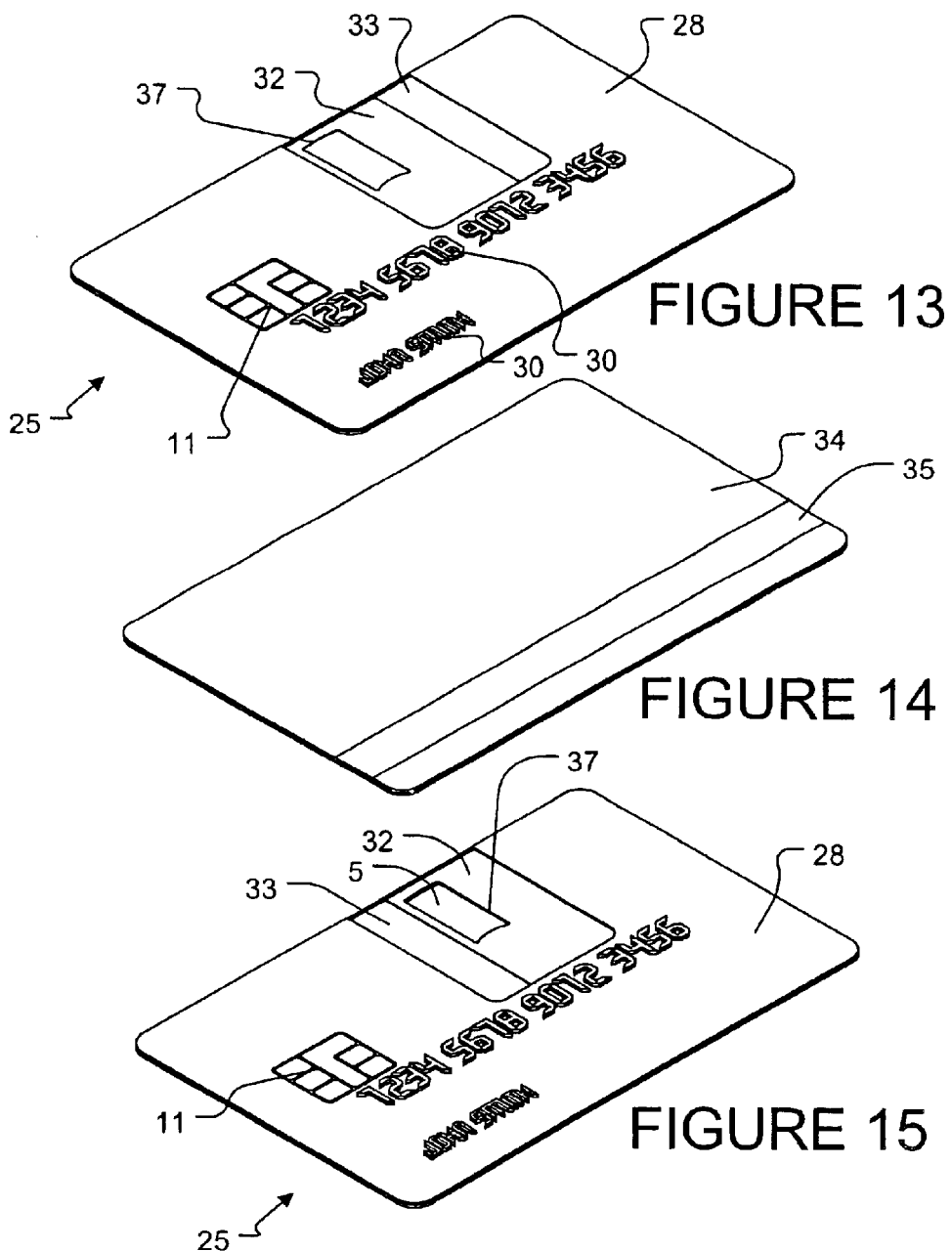

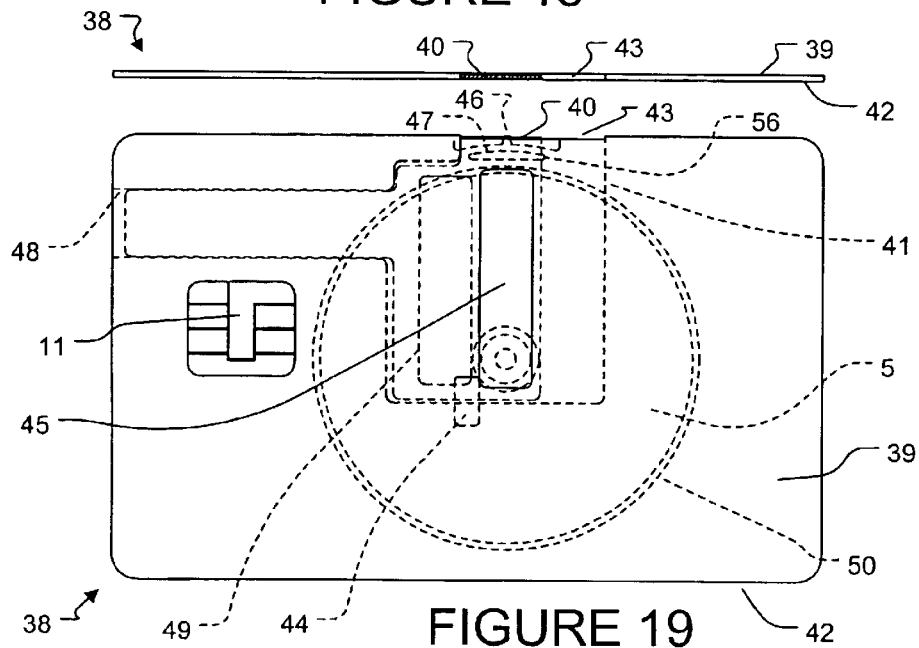
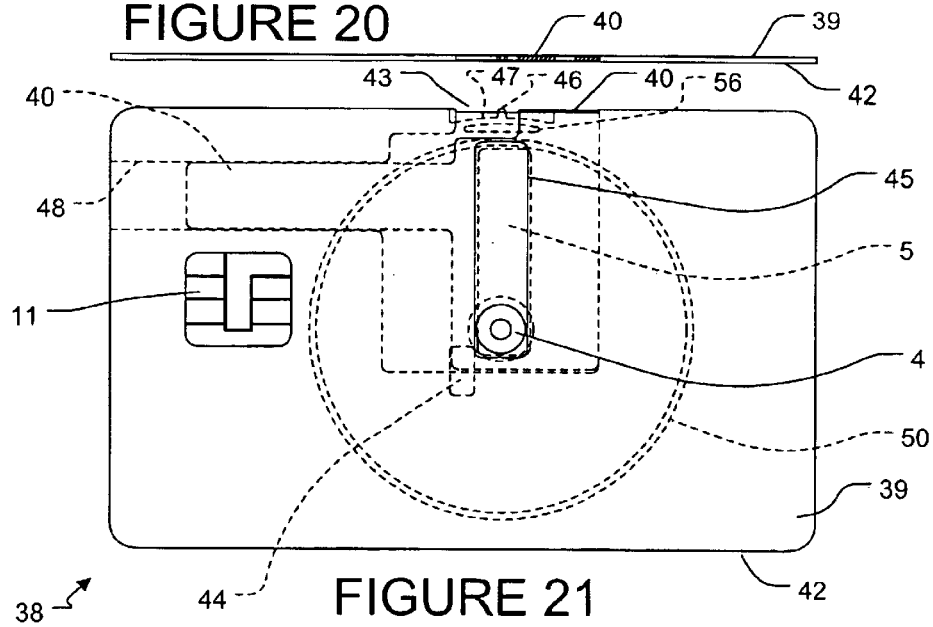

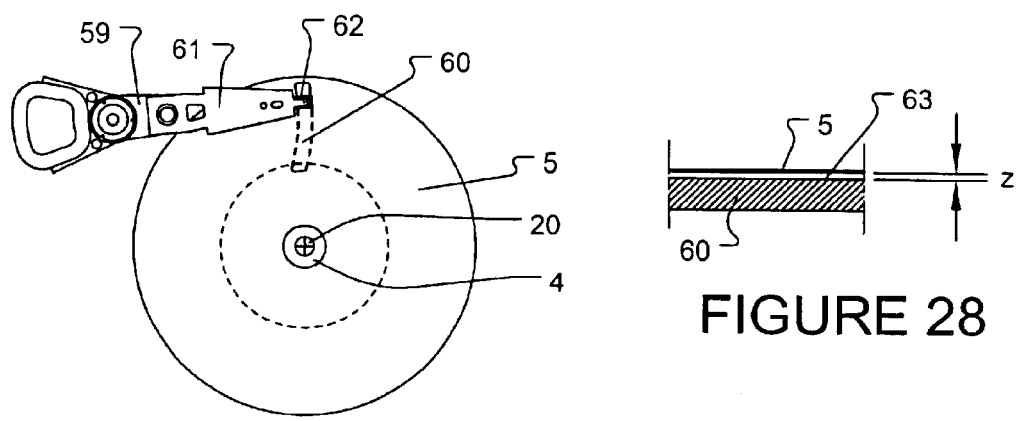
FIGURE 28
FIGURE 27
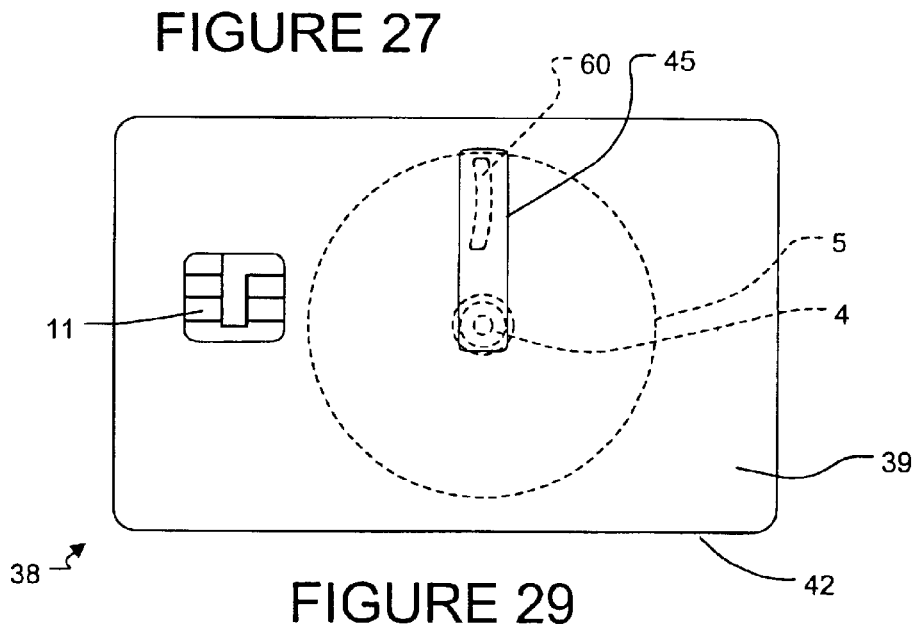
FIGURE 29

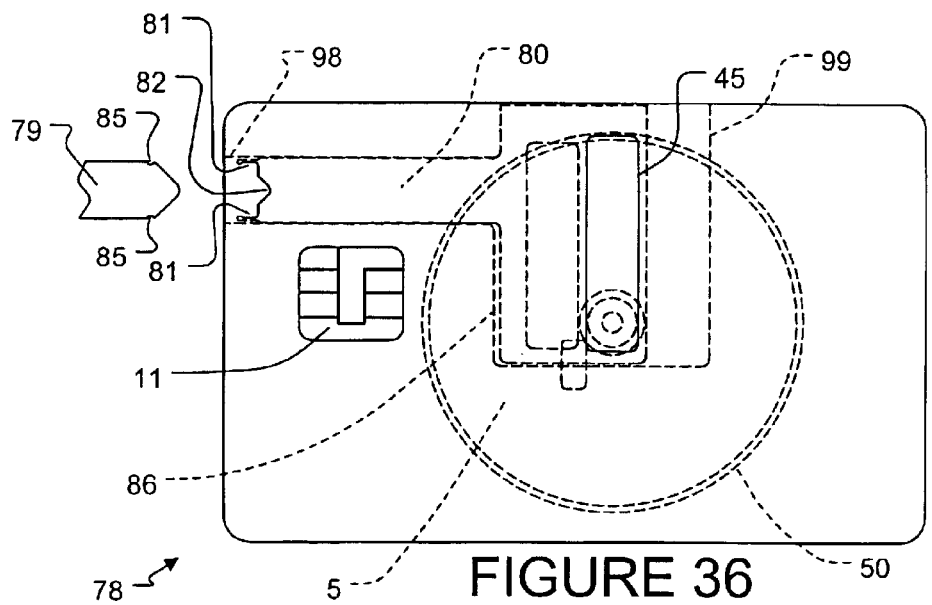
FIGURE 36
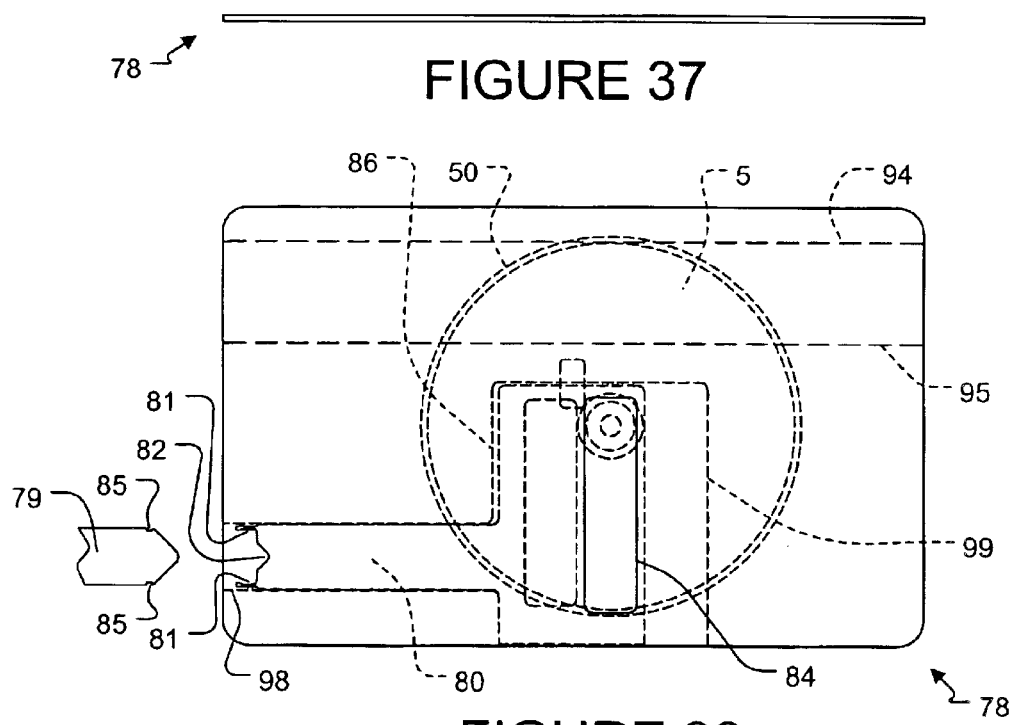
FIGURE 37
FIGURE 38

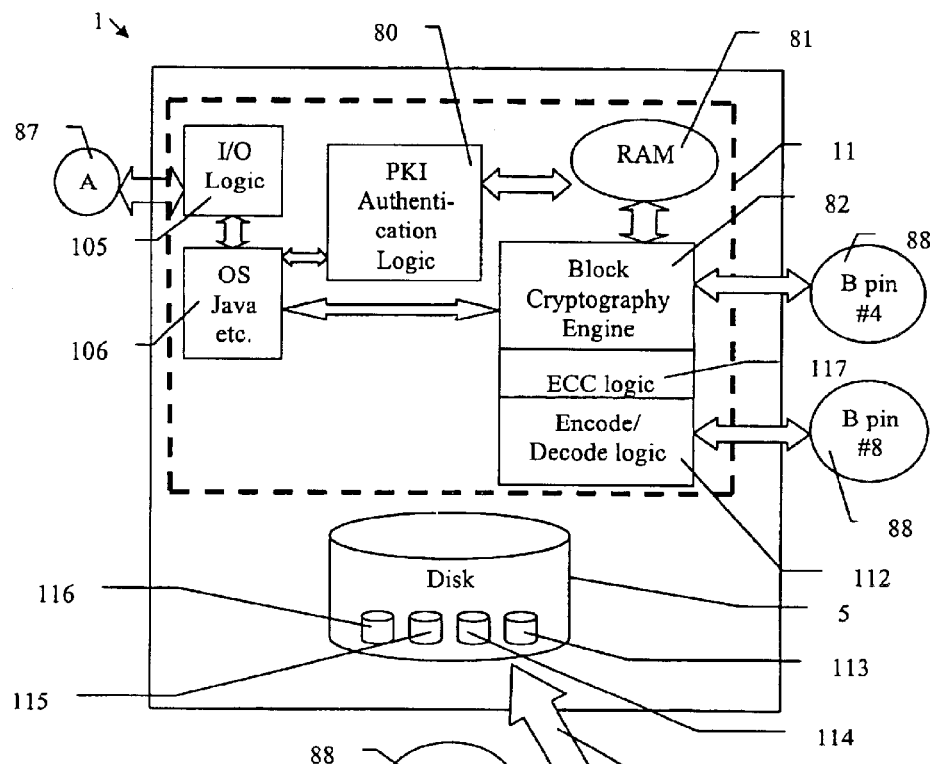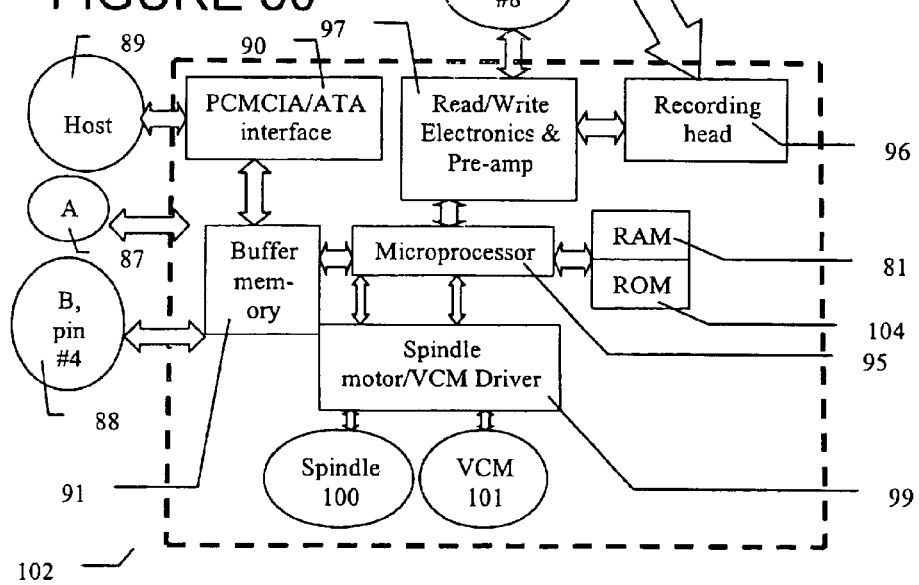
FIGURE 50

SMART CARD WITH ROTATING STORAGE

CROSS-REFERENCES TO RELATED APPLICATIONS

Not Applicable

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK.

Not Applicable

BACKGROUND OF THE INVENTION

This invention relates generally to the storage of information and to credit cards, as well as to software applications serviced by these cards. The credit card is ubiquitous and almost every wallet contains two, and often more cards. This invention provides a method by which a large storage volume can be offered on such a card, providing greater versatility and functionality to a common and useful device, for example, sufficient memory to store an entire feature film on each card.

Prior art teaches the fabrication of a card with a PVC plastic substrate and artwork laminated to and/or printed onto the front face, and minimal (a magnetic strip) or no storage. Lettering is embossed on the card, and space provided on the back for a specimen signature. All transactions have the backing of a reputable financial institution. A remote infrastructure requires the merchants to call for authorization of charges. The financial institution gives the card holder credit to cover these transactions, and maintains an organization for billing, transaction verification and fraud control. In the United States long distance telephone calls are economical, so a card with a magnetic strip on the back, containing about 140 bytes of information has become popular. The user or the merchant swipes the card on a reader, enters a PIN code and a dollar amount of the transaction. The resulting information is then transmitted via modem or a network to a remote site for authorization. The limited storage available on these cards, however, is not sufficient to reduce or eliminate the complex, remote infrastructure or the cost to process each transaction. In Europe and other countries where telephone services are expensive, a unique card known as a Smart Card has become popular.

The Smart Card comes in a variety of configurations, some with integrated circuit memory of about 1 to 8 Kbytes and others with an additional integrated circuit on the card to manipulate the on-board memory. The maximum storage offered in these cards is 32Kbytes, which was the same amount of on-board memory available on a PC when it first shipped in the early 1980s. The PC, however, required an external floppy drive with 150K bytes of replaceable volume to become a useful appliance. Smart Cards, possibly for the lack of sufficient memory, have not been widely accepted by the consumer in the United States.

Optical memory cards such as those taught by U.S. Pat. Nos. 6,199,761; 5,932,865; 6,120,907 and others, consist of an optical recording media bonded to the surface of the card. Such optical cards require a unique reader, now costing more than $2,000. Each optical card had a maximum storage capacity of 4.9M Bytes. In view of their greater memory, these cards have found niche applications, but the high cost of implementation has limited their popularity.

Other prior approaches, such as U.S. Pat. Nos. 6,131,816 and 5,107,099, teach a unique magnetic strip made from stainless steel and sputter coated with high coercivity magnetic films and laminated in the Card. The design of a special purpose reader is also taught, which removes this strip, installs it on a reciprocating table and a magnetic recording head is utilized to read and write data to and from the strip. The inventors claim large storage capacity could be attained on each card, however, the card reader is unique and expensive, similar in characteristics to the optical card, and requires the development of a significant infra-structure to support such a system.

Prior art also teaches the design of special purpose magnetic and optical storage products that record and read data back from unique mediums, such as floppy disk drives, ZIP disk drives, hard disk cartridge drives, CD-R/W and DVD-RAM products. All these devices require the use of a recording medium that is larger, and thicker than a Credit Card, and consequently, do not offer the convenience of being able to be slipped into a wallet for easy transportation.

Cards containing large storage volume can provide services that hereto required the maintenance of a significant infrastructure to control unauthorized access to data, to equipment, and to facilities. For example, an American Express Credit Card, VISA or MasterCard adopting the invention herein can serve as a financial card, a personal wallet, a record keeper, a storage of favorite songs (with CD quality), a secure key to access confidential records at financial institutions or on the Internet, an electronic album with both still and video clips of family and friends, a complete set of personal medical records, and a host of other features. By virtue of the card, one does not need to remember a variety of passwords or personal identification pins (PINs) to access bank accounts. The Card has all this data, and furthermore, this data can be encrypted with a 512 bit or larger key to provide a high level of security.

Data storage is fundamental and can increase the versatility of the common credit card. Processing power can be located in the reading device or local on the card in a manner similar to the Smart Card. If the credit card will be used in equipment that contain a sophisticated processor, however, burdening the credit card with the added expense of a processor chip may not be necessary. This invention provides a method that adds very large storage capacity on a credit card like device. It also provides an economical reader for use of the credit cards so equipped. The card utilizes the industry standard PCMCIA interface and form factor. Additionally, the invention is capable of being implemented at very low cost, for both the card and the reader. The invention described herein focuses on the design of the card, while a commonly owned co-pending application describes the reader.

BRIEF SUMMARY OF THE INVENTION

This invention provides a credit card-sized card having a rotating magnetic disk therein for storing data. The card is preferably compatible with international standards for credit cards, so that it matches in size and thickness an ordinary credit card, yet is able to store substantial amounts of information, for example, from 50 megabytes to 5 gigabytes and greater. Despite the presence of the rotating magnetic disk within it, the card complies with the international standard for credit cards—ISO 7816.

In a preferred embodiment, the card consists of three layers. There is a lower thin stainless steel layer, an intermediate plastic layer within which a cavity is formed for the rotating magnetic disk, and an upper plastic layer. The stainless steel layer or the upper plastic layer have openings therein for accessing the disk to read from it or write to it, and an opening for engagement with a motor in an external system into which the card is inserted for reading and writing. A shutter covers these openings when the card is not engaged in the reader. In some embodiments of the card, an integrated circuit is affixed to the intermediate layer or to both the intermediate layer and the upper plastic layer and extending through the upper plastic layer or the bottom stainless steel layer such that it is co-planar with this layer. This integrated circuit has surface contacts to connect to external systems in compliance with smart card standards. In other embodiments, a further upper layer is added to the card to provide for an embossed credit card number and name, and a magnetic strip is affixed to the back of the card to make it compatible with legacy equipment. The card's construction enables it to flex in a manner required by the ISO 7816 standard. In other embodiments, the integrated circuit provides cryptography capabilities so that data sent to the card or received from the card may be encrypted, the card's identity determined, and other security features provided.

In a preferred embodiment, the card includes a first layer, a magnetic disk for storing data, a second layer affixed to the first layer having an opening adapted to receive the magnetic disk, and a third layer affixed to the second layer to establish an enclosure within which the magnetic disk may rotate. The enclosure is typically lined with appropriate material to protect the surface of the magnetic disk, which itself may be a Mylar substrate coated with at least a magnetic film or a magnetic coating sputtered on a flexible metal substrate.

BRIEF DESCRIPTION OF THE DRAWINGS

FIG. 7 illustrates the external shutter arrangement;

FIG. 8 illustrates the attachment details of the shutter construction;

FIG. 9 is the plan view of an ISO 7816 implementation of the card;

FIG. 10 illustrates defection of the ISO Card in the transverse direction;

FIG. 11 illustrates defection of the ISO Card in the longitudinal direction;

FIG. 13 is a top view of the card with the shutter in the closed position;

FIG. 14 shows the back of the card and the magnetic strip;

FIG. 15 depicts the card with the shutter in the open position;

FIG. 18 is a slide view of the card with the shutter in the closed position;

FIG. 19 is the top view of the card with the inner details illustrated in broken lines;

FIG. 20 is the side view of the card with the shutter in the open position;

FIG. 21 is a top view of the card with the shutter in the open position and other internal component details in broken lines;

FIG. 27 shows the recording head arrangement in the reader as it is referenced to the disk and hub position;

FIG. 28 illustrates the details of the static element creating the hydro-dynamic pressure pad during rotation of the disk at high speeds;

FIG. 29 shows the location of the static head element in the card;

FIG. 36 is a top view of a card with a push-plate shutter operation;

FIG. 37 is a side view of the card shown in FIG. 36;

FIG. 38 is a top view of a card with a push-plate shutter and a magnetic strip configured at the back of the card for compatibility with legacy readers;

FIG. 50 is a block diagram of a further embodiment of the reader electronics and its interface with the card.

DESCRIPTION OF THE PREFERRED EMBODIMENTS

ISO 7816 is an internationally accepted standard for the size of credit cards, their flexibility, arrangement of information, and other features. The preferred embodiments of this invention relate to cards that conform to the ISO 7816 standard for credit cards. It will be appreciated that there are other card configurations that are thicker (or of a different size) than this standard, and the invention also could be applied to those cards utilizing the concepts described herein.

Figure 1:
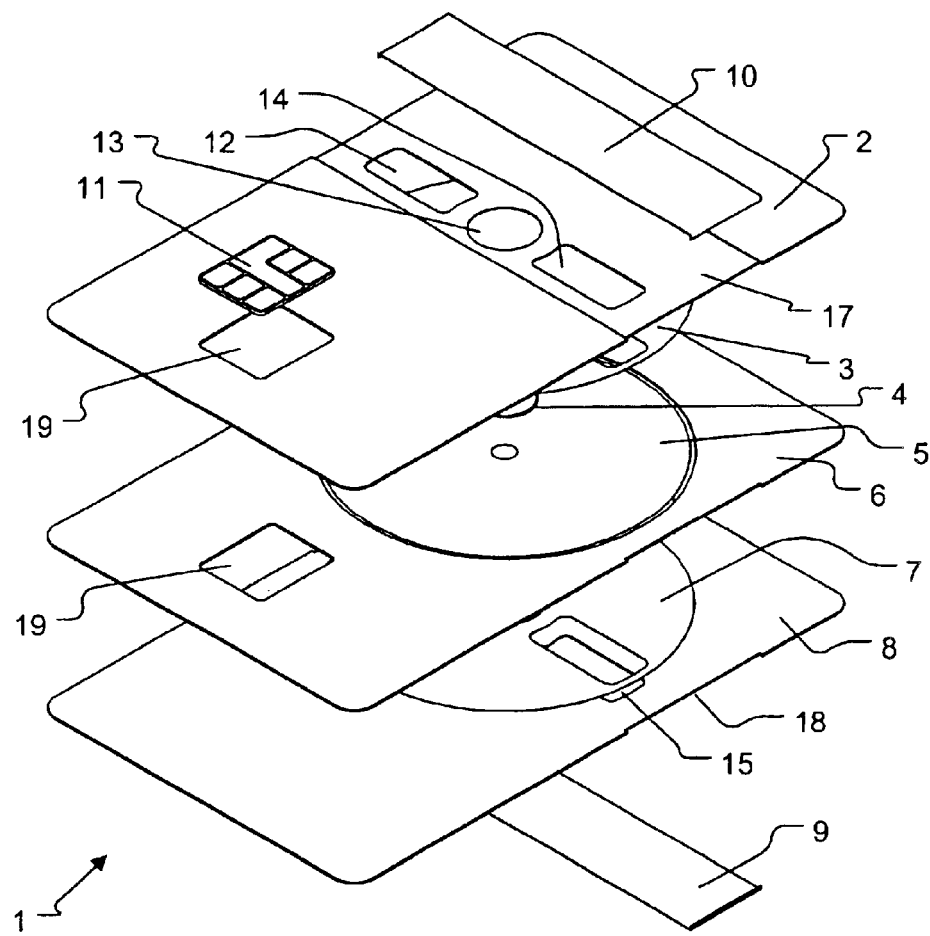
FIG. 1 is an exploded view of a symmetric card with an external shutter system.

FIG. 1 illustrates a card 1 formed from a series of layers. To comply with the ISO 7816 standard, the thickness of the card is approximately 0.031 inches. Its length and width are about 3.37 and 2.125 inches respectively. The top layer 2 is formed from a sheet of 300 stainless steel that is about 0.005 inches thick. There is a step down in thickness in this layer of about 0.0025 inches for a length of about 0.906 inches, 17, where a shutter 10, also of 300 stainless steel approximately 0.0025 inches thick, slides. As will be described, the shutter 10 is configured to selectively covers openings 12, 13 and 14.

Figure 5:
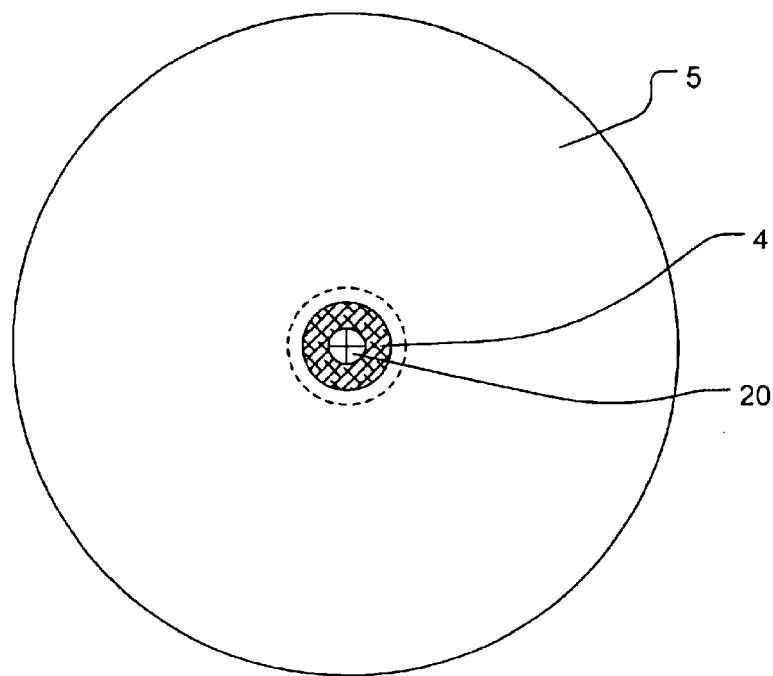
FIG. 5 illustrates the recording disk and hub arrangement.

This card is constructed with layer 2 laminated with layers 6 and 8. Layer 8, like layer 2, is formed from 300 stainless steel to provide a lower thickness area 18 where shutter 9 slides. Layer 6, preferably PVC plastic, has a circular opening where a magnetic disk 5 is housed. A hub 4 approximately 0.010 inches thick is attached to both sides of the disk 5 (see discussion in conjunction with FIGS. 5 and 6). Preferably, magnetic disk 5 is a disk with a Mylar substrate and at least a magnetic film coated on one surface of the substrate, such as used in existing ZIP and floppy diskettes. Alternatively other materials may be used. For example, the disk may also be made from stainless steel, which is polished and sputter coated as described in U.S. Pat. No. 5,968,627 or U.S. Pat. No. 6,113,753. In this case, the disk is approximately 0.0008 inch thick, and preferably has high coercivity magnetic films sputter deposited on both sides. Identical coatings on both surfaces of the disk cause it to remain normally flat. The magnetic films and surface treatment is similar to that utilized on contemporary hard disk storage products.

The current state of the art, for this magnetic film technology, is 20 Gbits/in$^2$ area recording density. Disk 5 and the hubs 4 are free to rotate in a cavity created in layer 6 of about 0.017 inch thickness. The disk diameter is about 1.772 inches and the circular hole in layer 6 is made approximately 0.05 inches larger diametrically. Two liners 3 and 7, made from, in one embodiment, lens cleaning tissue about 0.0015 inch in thickness and in other embodiments non-woven fabric sheets that are about 0.003 inch thick, are attached to layers 2 and 8 such that they face the surfaces of disk 5. Other embodiments of the disk 5 utilize a Mylar substrate and a slurry coated magnetic film such as a high capacity floppy disk or sputter coated substrates which includes glass, ceramic, Aluminum or Titanium.

Figure 2:
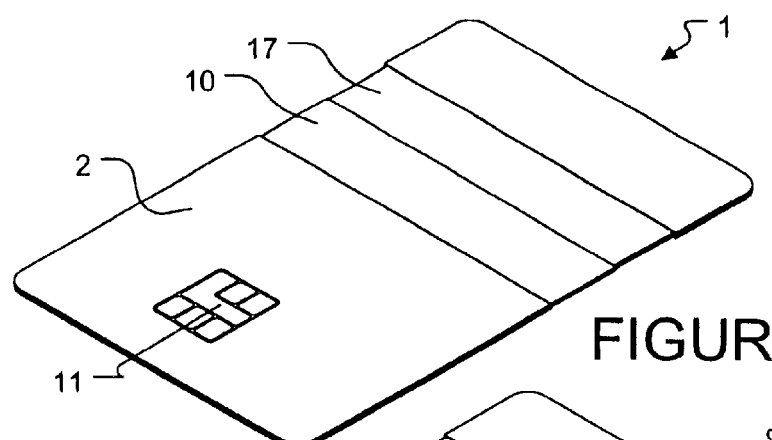
FIG. 2 is the top view of the card with the top shutter in the closed position.
Figure 3:
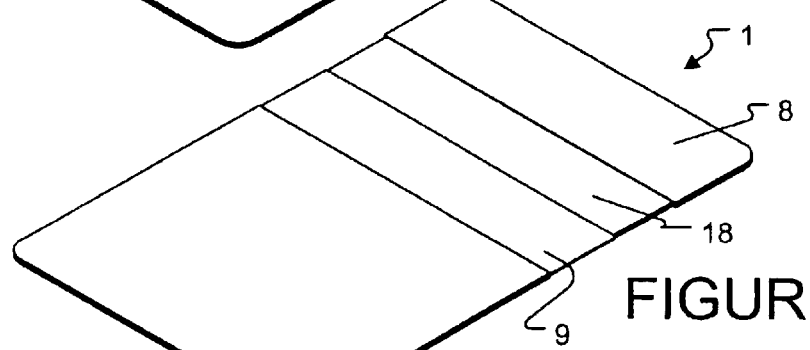
FIG. 3 is the bottom view of the card with the shutter in the closed position.
Figure 4:
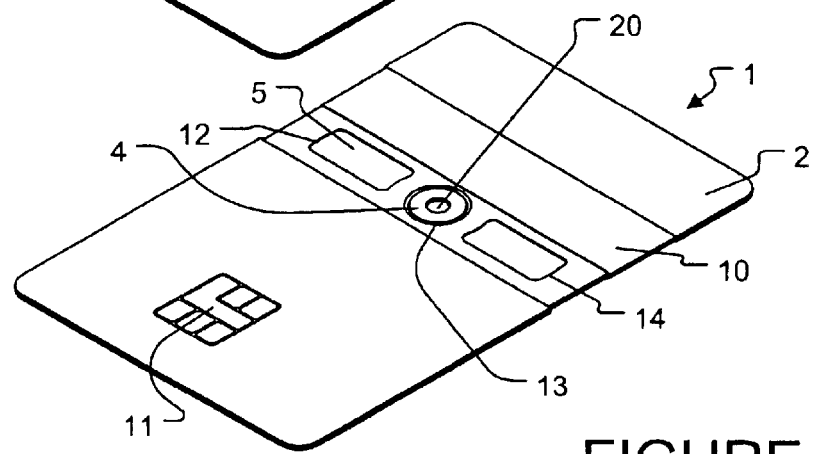
FIG. 4 is the top view of the card with the shutter in the open position.

In some embodiments, a "Smart Card" type chip 11 is affixed (e.g. glued) in the cavity created by openings 19 provided in layers 2 and 6. Of course, other card configurations without a chip are also possible. The completed card is shown in top view in FIG. 2, and in bottom view in FIG. 3. The shutters 10 and 9 selectively cover slots 12, and 14 created in layers 2 and 8. When these slots are uncovered, a recording head in the reader can access disk 5 surfaces for data recording, and the spindle motor chucking surface 22 (FIG. 6) can engage hub 4 through slot 13. The spindle motor 21 itself is located in the reader.

Figure 6:
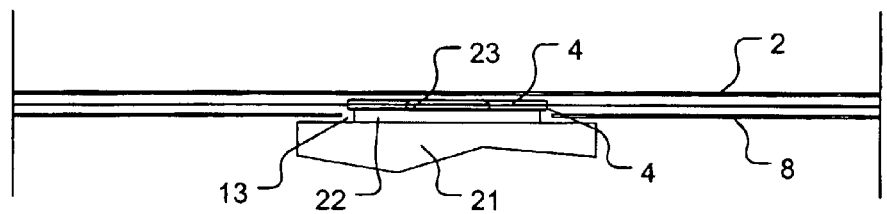
FIG. 6 is a section view of the card and spindle motor configuration.

One function which occurs when the card is inserted into the reader is that a pawl in the reader engages with the shutters 9 and 10 (FIGS. 2 and 3) sliding them to uncover openings 12, 13 and 14. Upon further insertion into the reader, the shutters are fully opened and a magnetic chuck 22 in the reader's spindle motor 21 contacts the hub 4. Hub 4 is made of magnetically soft material and is attracted to the spindle motor chucking surface 22, containing a permanent magnetic. The hole 20 in hub 4 is centered onto the spindle rotor shaft 23. The top and bottom layers of the card are supported in the reader in a manner similar as illustrated in FIG. 6, to provide a cavity that is approximately 0.017 inch thick. Within the cavity disk 5 can rotate at a high speed, for example, 3600 RPM.

Figure 45:
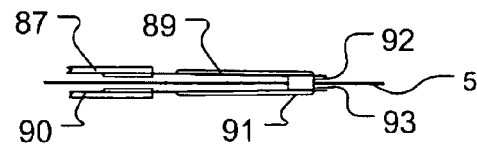
FIG. 45 shows an opposed head arrangement for two sided recording.

The card construction discussed above is referred to herein as symmetric because the card can be removed, inverted, and re-inserted into the reader for data to be accessed utilizing a single recording head assembly. Other embodiments of the card include two recording heads arranged in an opposed configuration on both sides of disk 5, for example, as shown in FIG. 45. In these embodiments only one set of access ports such as 14 and 15 are required and not 12 and its opposing access opening. The shutters 10 and 9 are external to the card body, but contained within the ISO thickness of 0.031 inches, specifically the shutter material thickness is 0.0025 inches and the thickness of the layers 2 and 8 is reduced in the areas 17 and 18 for the shutters to operate within the card form factor. This arrangement also allows the shutters to establish a labyrinth seal with surfaces 17 and 18, restricting contaminants from entering the cavity within which the recording medium is situated. The shutter width is made at least 0.1 inch larger than the width of the openings 12, 13 and 14 in layers 2 and 8.

FIG. 7 illustrates the construction of the shutter. The shutter 10 and the shutter 9 overlap as shown in FIG. 8. This overlap is formed with the card body between the shutters as the final assembly (for clarity the card body is not shown in FIGS. 7 and 8). These shutters are then spot welded or laser welded on the sides such as 24 to establish a strong bond and provide clearance of up to 0.0005 inch, for the integrated shutter body to slide smoothly on surfaces 17 and 18.

The material chosen for use in this card structure helps assure that certain requirements of the ISO standard are met. Specifically, as shown in FIGS. 9, 10 and 11, the ISO standard requires that cards be flexible enough to be deflected as shown transversely in FIG. 10, and longitudinally in FIG. 11. Displacements "y" and "x" are 2 centimeters and 1 centimeter respectively according to the ISO specifications. The card structure described above also preferably utilizes a particular combination of materials for each of the layers in the laminate structure. Other suitable material combinations include all plastic or thermo-plastic layers, layers made from Titanium, Titanium alloys, Copper, Copper alloys, Aluminum, Aluminum alloys, Magnesium and Magnesium alloys, other metals and ceramics can also be utilized. Furthermore, the thickness of the layers may be different than the thicknesses described herein.

Figure 12:
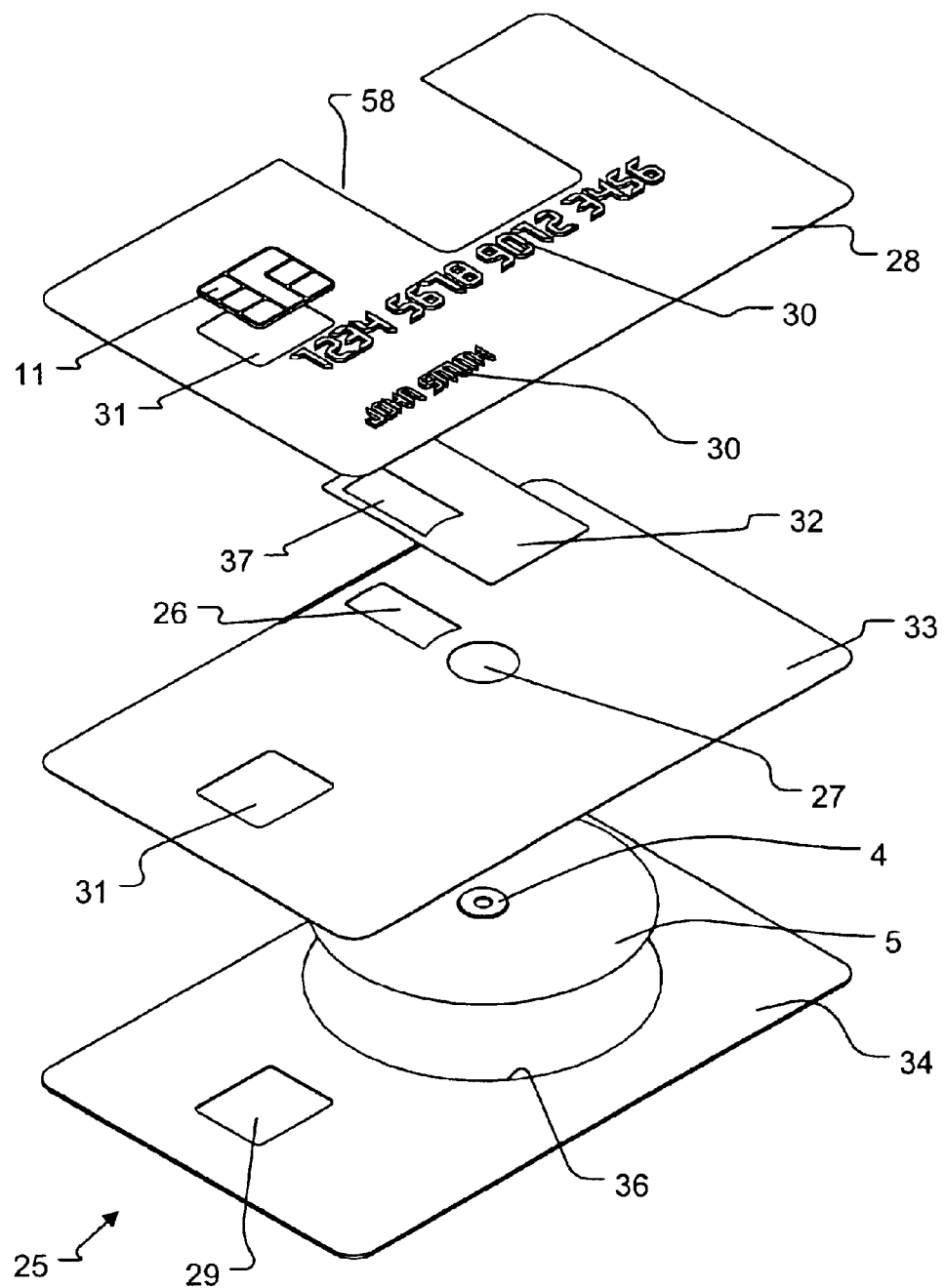
FIG. 12 is an exploded view of a card conforming with legacy equipment.

Because there are no embossed characters, and no magnetic strip, the preferred embodiment of card 1 of FIG. 1 will not operate with legacy equipment. FIG. 12 illustrates another embodiment of the invention in which a card, 25 is designed to operate with legacy equipment. Card 25, like card 1, has a laminated construction. An opening 26 provides access to the recording head and an opening 27 to the spindle chucking surface. No access is provided on the back of the card. The data storage capacity available with this card is thus only half of card 1, but the card operates in legacy equipment.

FIG. 12 illustrates the structure of this card. A bottom layer 34 preferably of PVC plastic has a thickness of approximately 0.021 inch. A circular cavity, 36, is formed in layer 34 that is about 0.015 inch deep and about 0.05 inch larger diametrically than the diameter of disk 5. The bottom wall of this cavity is about 0.006 inch thick. An alternative construction for layer 34 consists of two PVC layers, one 0.014 inches thick and the other 0.006 inches thick laminated together, where the circular cavity is defined in the 0.014 inch thick layer, and 0.001 inch thickness is provided for the glue line between these two layers. Disk 5 has hubs attached on both sides. Hub 4 on the side that engages with the spindle chuck 22 is approximately 0.01 inch thick, and made from a magnetically soft material. The hub on the opposing side establishes clearance to keep the disk from rubbing against the bottom wall of cavity 36 during transportation, and is about 0.004 inch thick. The cavity to house the Smart Chip 29 is about 0.01 inch deep in layer 34.

Layer 34 is laminated with layer 33 which contains access opening 26 for the recording head and opening 27 for the spindle motor chuck 22. Layer 33 is formed from a 300 stainless steel sheet that is about 0.0025 inch thick. The shutter 32 has a slot 37, which when the shutter is fully open, aligns with the opening 26 and 27 in layer 33. The shutter is also constructed from 300 stainless steel and is also 0.0025 inch thick. The top layer 28 is fabricated from about 0.0055 inch thick material and has characters 30 embossed as shown in FIGS. 12, 13 and 15. The area where shutter 32 is located under the top layer 28 has a recess (not shown) of about 0.003 inch creating a cavity between the bottom of layer 28 and the top of layer 33 for the shutter to slide smoothly. The card structure is such that the top layer can be affixed after the disk is encased between layers 34 and 33. This enables it to be embossed before being attached to the remaining structure. A thickness of 0.001 inch is provided for the glue lines between the layers 28 and 33, and 34 and 33.

After assembly, a magnetic strip 35 is attached to the back of layer 34 as shown in FIG. 14. Artwork is painted on the top layer utilizing a process such as one developed by Cellotape Inc., 47623 Fremont Boulevard, Fremont, Calif. 94538. The artwork may utilize a full color process or a two color process depending on the specifications. The thickness of this artwork, including a wear resistant overcoat, is less than 0.001 inch, per the specifications provided by Cellotape Inc. An alternative construction is to make layer 28 of plastic and print the artwork with a die sublimation process.

Figure 16:
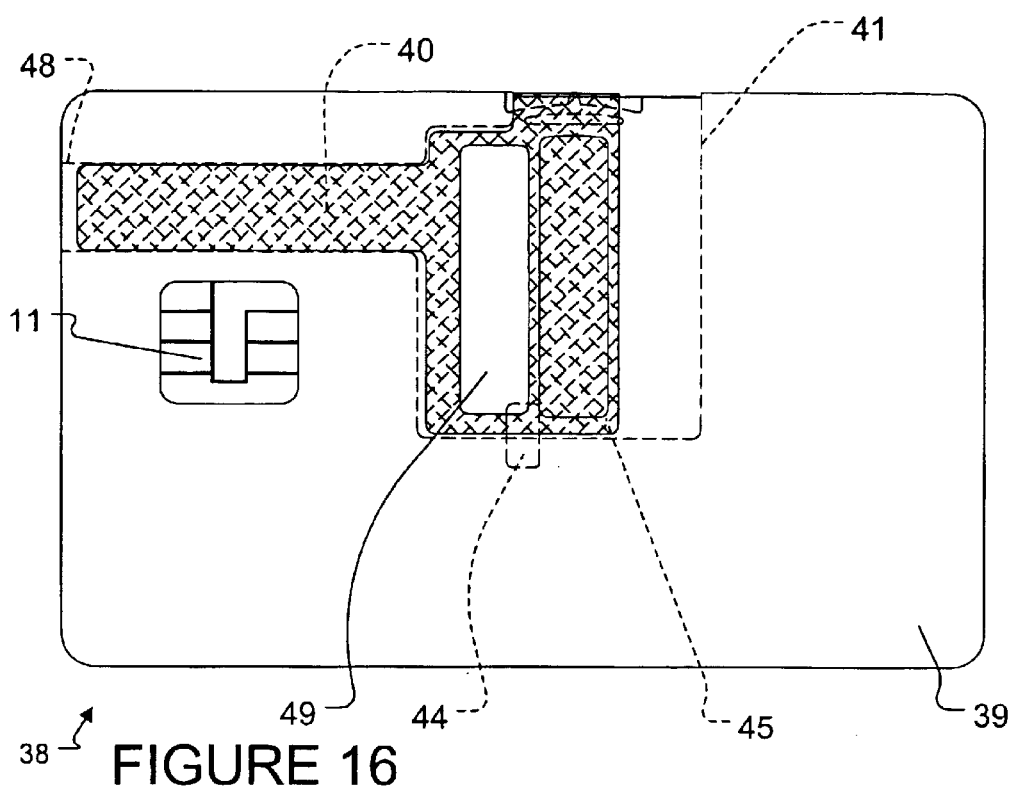
FIG. 16 illustrates a shutter arrangement for use in a laminated construction where the shutter is covered by the top layer.
Figure 17:
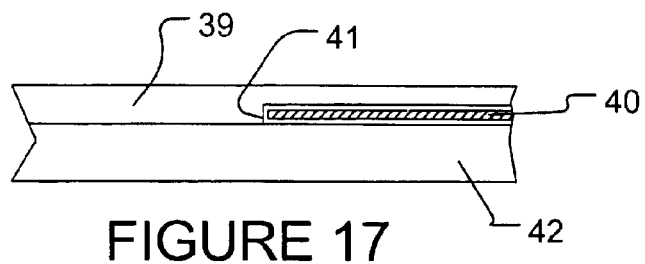
FIG. 17 shows the details of the laminating layers forming the card.

Card 25 is compatible with legacy equipment, and provides a large storage volume. The area 58 where shutter 32 operates, however, is exposed and thus subject to handling damage. FIGS. 16 and 17 illustrates a card 38 that incorporates a shutter 40 with a long arm that slides inside a cavity 41 and 48 formed in the top cover 39, thereby encapsulating the shutter 40. This reduces the susceptibility to handling damage. The top cover preferably is approximately 0.006 inch thick 300 stainless steel sheet with a cavity 41, 48 about 0.003 inch deep, on the back of the layer. The shutter 40 is about 0.0025 inch thick 300 stainless steel and contains an opening 49, which in the fully open position is aligned with slot 45 on the top cover 39. The slot 45, shown in FIG. 21, allows access to the recording head to operate against the disk 5, as well as providing an opening for the spindle chuck 22 to engage with hub 4. Opening 45 is a single slot in the top cover 39.

As shown by FIG. 17, the card 38 structure is, starting from the upper surface, a top-most layer, 0.001 inch, for artwork directly painted or printed onto layer 39. Beneath the about 0.006 inch thick layer 39, is a cavity 41 and 48, 0.003 inch deep on the bottom face, which allows a shutter 40 to slide inside this cavity. Alternatively, layer 39 can be provided as a laminate with a top 0.0025 inch thick stainless steel sheet, a bottom 0.0025 inch stainless steel sheet, and the shutter cavity is defined in the bottom sheet. These two sheets are laminated together with 0.001 inch thickness for a glue line. A tab 44 is provided as shown in FIGS. 16, 19 and 21 to support shutter 40, specifically over the zone where disk 5 spins at high speeds. The top layer 39 is laminated to layer 42 made of PVC plastic and about 0.024 inch thick. A cavity 50 is formed in this PVC sheet that is about 0.019 inch deep.

Hub 4 is approximately 0.009 inch thick and made of a magnetically soft material. A liner (not shown) about 0.0015 inch thick is attached to the bottom of the top cover 39 in the area exposed to disk 5, but cut away over the recess area 41, such that the liner does not interfere with the operation of shutter 40. Disk 5 is about 0.0008 inch thick as described earlier. Another hub is attached to the back of the disk to maintain a clearance with the back cover when card 38 is not installed in the reader. Another liner (not shown) about 0.0015 inch thick is attached to the bottom of cavity 50. The thickness of the cavity where the disk spins at about 3600 RPM is about 0.016 inch. Furthermore, cavities similar to 29 and 31 shown in FIG. 12 are created in layer 39 and 42 to house the Smart Chip 11.

The construction of card 38 is such that the bottom surface of 39 and the top surface of hub 4 are in the same plane when the card is installed in a reader. Additionally, card 38 has features 46 and 47 shown in FIGS. 19, 21 and 24, and a slot in the tab (not illustrated) in shutter 40 that is bent over the edge of the card 38 and sliding in zone 43. Feature 47 is a flexure element formed in layer 42 such that it can deflect in cavity 56 when a force is incident on tab 46. Features 46 and 47 function to lock the shutter from casual actuation, and thereby protect contaminants from entering the disk cavity 50.

Figure 22:
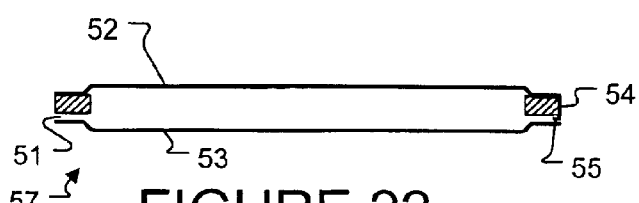
FIG. 22 is a frontal section view of the reader case.

FIG. 22 illustrates a sectional view of a reader 57 that is the subject of a commonly assigned co-pending application. The reader 57 has a top cover 52 and a bottom cover 53. A cavity 51 is formed between these covers within which card 38 is inserted. A flexure 54 is provided in the cover 52 of the reader 57. This flexure has a unique edge 55.

Figure 23:
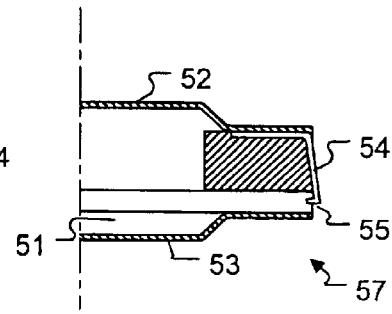
FIG. 23 shows details of the flexure tab.
Figure 24:
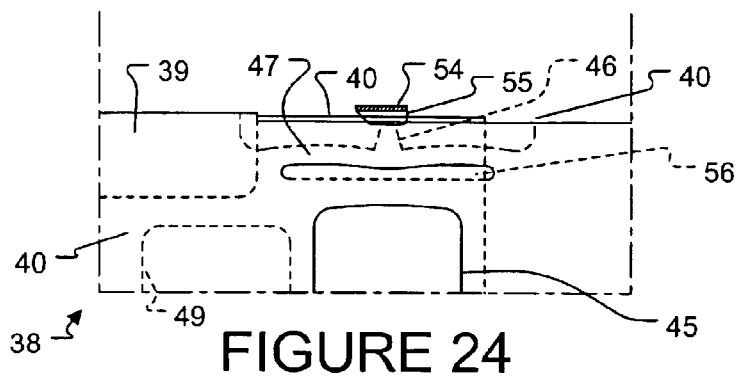
FIG. 24 illustrates the details of the shutter lock mechanism and actuation by the flexure tab in the reader.
Figure 25:
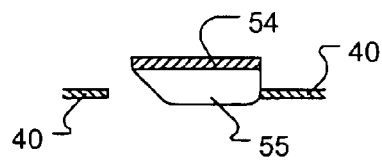
FIG. 25 shows the shutter being actuated by the flexure tab as the card is inserted into the reader.

FIG. 23 is an expanded view of flexure 54 when a card is installed in the reader 57. The flexure deflects until edge 55 finds the slot in the tab on shutter 40. At that point the force of flexural 54 urges the tab 46 in the card 38 as shown in FIG. 24. Both the flexure 54 and the edge 55 penetrate the plane of the shutter 40 as shown in FIG. 25. Continued insertion of the card 38 in reader 57 causes tab 55 to slide the shutter 40, moving slot 49 to align with opening 45 in the top cover 39 (as shown in FIG. 21). This is the operating position of the card 38.

Figure 26:
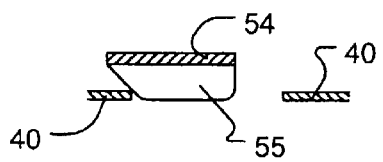
FIG. 26 illustrates the shutter and flexure tab arrangement during the removal of the card from the reader.

During ejection of the card 38, the tab 55 will move as a result of the card being pulled out of the reader 57, such that it engages the shutter 40 as shown in FIG. 26. The shutter 40 will move, closing the opening 45 in the top cover 38, as shown in FIG. 19. When the shutter reaches the position shown in FIG. 24, where it will not slide any further, the resisting force incident on tab 55 and the taper angle will cause flexure 54 to bend, disengaging 55 from the shutter 40 tab. Tab 46 will become aligned with the opening in shutter 40, and continued withdrawal of the card 38 from the reader 57 will allow tab 46 to lock shutter 40 from casual actuation.

Data is recorded and read back from disk 5 using a magnetic head suitable for the particular recording materials and conditions of the disk, for example, of the design described in U.S. Pat. Nos. 4,974,106 and 6,023,393. One common floppy disk drive operates with a flexible Mylar disk sandwiched between two recording heads. Upon rotation of the Mylar disk at about 300 RPM, each head urges the disk such that a stable, sliding interface in developed, to record and read information back from the magnetic film on the disk surfaces. The technology described in the above U.S. patents teaches a head construction suitable to record information onto a flexible disk rotating at high speeds, for example, greater than 1800 RPM. FIG. 27 illustrates such a configuration. A head rotor 59 is attached to the reader, similar in construction to those found on most hard disk drive products, has a gimbal 61 and a recording head element contained in a slider 62. The gimbal 61 urges the slider 62 with a force of about 4.5 grams towards the surface of disk 5. Additionally, in this arrangement there is only one recording head 62, enabling a lower cost reader mechanism. Opposing this head is an element 60 with surface 63 similar in finish and properties to the air bearing surface on slider 62. The slider 62 operates on one surface of disk 5 while element 60, and specifically surface 63, is adjacent to the opposite face of disk 5. As shown in FIG. 28 there is a nominal clearance "z" between surface 63 and the disk when the rotor 59 is not positioned over disk 5, or during the time the card 38 is outside the reader.

When card 38 is installed in a reader in the operating configuration shown in FIG. 21, hub 4 is located on the spindle motor 21 as shown in FIG. 6, while hole 20 in hub 4 is centered onto the spindle rotor shaft 23. Upon command the disk is then rotated at a high speed, for example, 3600 RPM. At a sufficient speed a large air film develops between the surface of the disk 5 adjacent to surface 63 of element 60, as shown in FIG. 28. The rotor 59, in the reader, can be moved to cause head 62 to be urged towards disk 5. This will result in a thin air bearing film developing between the surface of the head 62, and a thicker air film between the opposing disk face and surface 63. Surface 63 then provides a hydro-dynamic pressure pad to stabilize disk 5 during recording and reading of data. An example of this is shown in U.S. Pat. Nos. 4,974,106, 5,968,627 and 6,023,393. Element 60 can be provided in the card 38 or in the reader for use with cards such as card 1. This element is made from a hard surface that can be polished similar to recording head surfaces utilized in hard disk drive products. Materials used to construct element 60 could be ceramics, such as calcium titinate, alumina, glass, a hard plastic or metal. Element 60 can be glued to or molded into layer 42 of card 38 as shown in FIG. 29. Further, element 60 is arranged to shadow the recording head 62 as it moves from the outermost recording track on disk 5 to the innermost track. In other embodiments the attachment of element 60 to 42 provides flexibility to allow surface 63 to better conform to disk 5.

Figure 30:
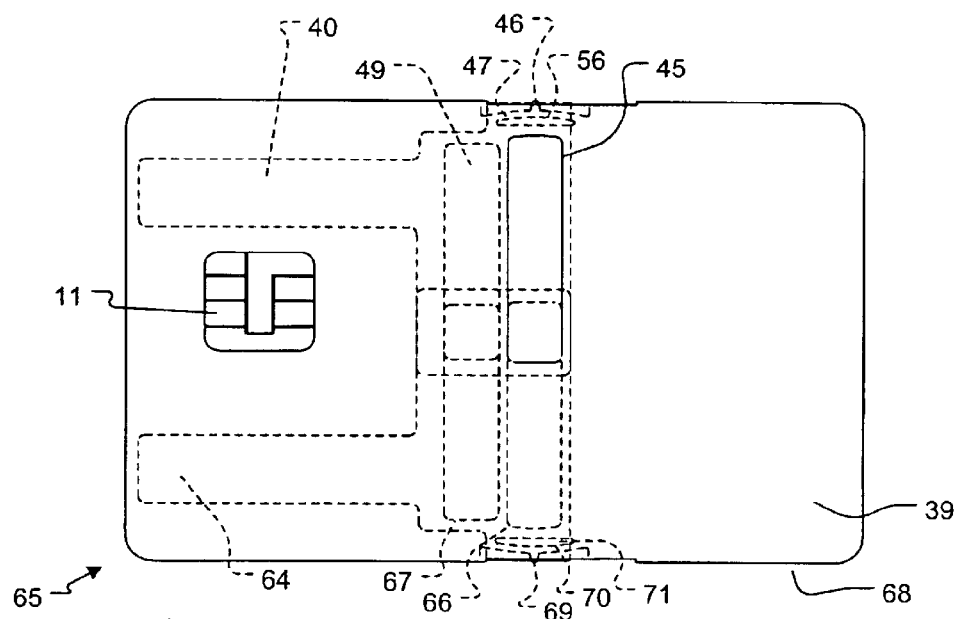
FIG. 30 illustrates a symmetric card construction with similar shutter and access ports on both the top and bottom surfaces.
Figure 31:
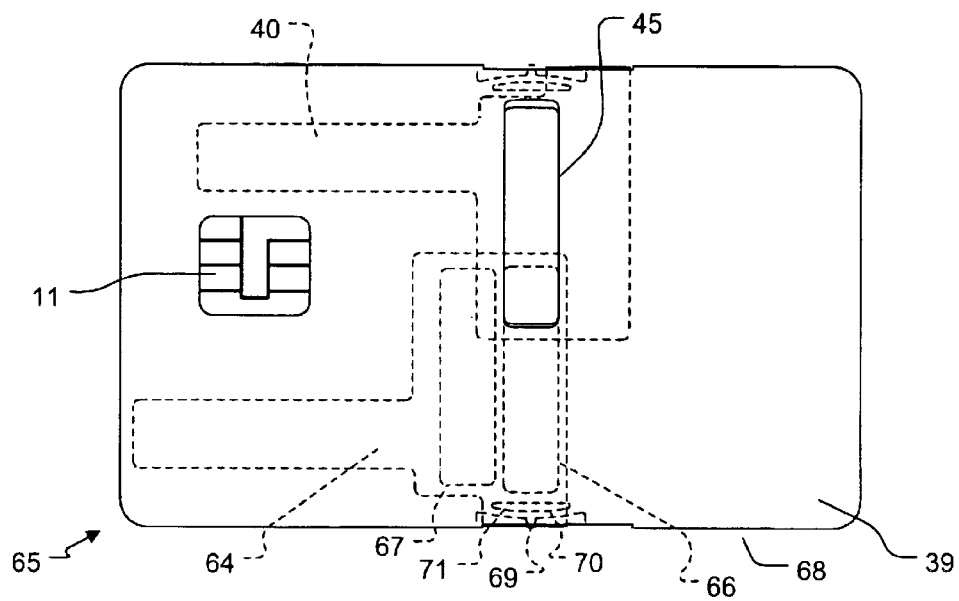
FIG. 31 illustrates the card with the top shutter in the open configuration and the bottom shutter in the closed position.

The structure of card 38 allows recording to occur only on one surface of disk 5. FIG. 30 illustrates a card 65 constructed with top layer 39 and bottom layer 68 of similar construction. This allows two shutters 40 and 64 to selectively cover the opening 45 on cover 39 and opening 66 on cover 68. The features 69, 70 and 71 are provided to operate with shutter 64 to lock this shutter during transportation, or when card 65 is inserted into reader 57 allowing access to the appropriate surface of disk 5 as shown in FIG. 31. The benefit of this arrangement is that card 65 can be removed from the reader 57, inverted and re-installed to record more information on the other side of disk 5, doubling the storage capacity available on each card. The additional cost to attain double sided recording is minimal.

Figure 32:
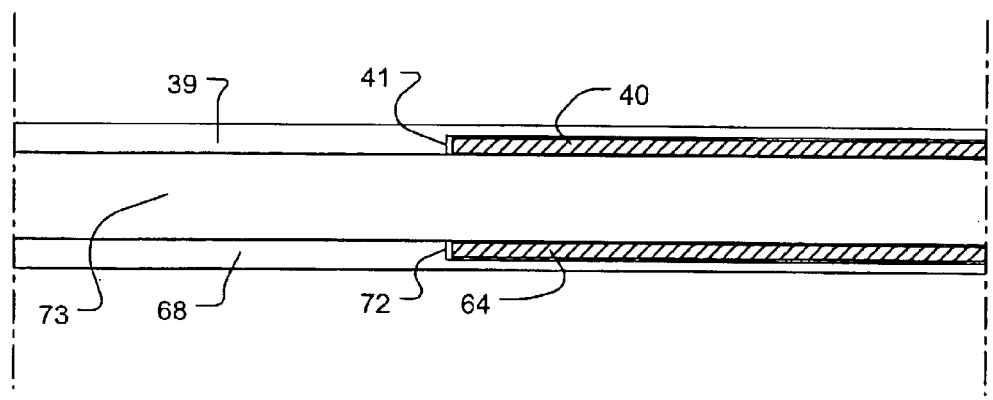
FIG. 32 shows the details of the top and bottom layers and the respective shutters.

FIG. 32 is a cross-sectional view which illustrates the details of card 65. The top layer 39, as described earlier, is preferably about 0.006 inch stainless steel sheet. A cavity 41 that is approximately 0.003 inch deep is provided on the back of layer 39 where shutter 40 slides. The bottom layer 68 is also about 0.006 inch stainless steel and includes a cavity 72 created on the surface adjacent to disk 5 where shutter 64 can slide. These layers are separated by a PVC layer about 0.018 inch thick which contains a circular opening 50 for housing disk 5. Two liners (not shown) about 0.0015 inch thick are attached to the surfaces of layers 39 and 68, facing disk 5. These liners are positioned in the area outside the shutter cavity. The operation of shutters 40 and 64 are independent from each other. Of course, other materials and film thickness can be utilized in the construction of the cards 25, 38 and 65, for example, an all plastic construction, a laminate of metal sheets and plastic, thermoplastics or ceramics to attain the desired characteristics and specifications of the ISO standard.

One benefit of this invention is use of an industry standard form factor and interface for the reader. This reduces infrastructure costs for implementing the card and reader. (The ISO card dimensions and the well known PC card dimensions are quite similar.) Failure to rely upon industry standard configurations has been a short coming of prior art cards, and limited their popularity. Cards 1, 25, 38 and 64 require pawls or a flexure 54 located in the reader 57 to selectively uncover the openings on the card surfaces to allow access to the recording head and the spindle motor. The flexure 54 deflects out of the reader form factor, and while this deviation may be acceptable in certain implementations, it will not be in others, where the reader may need to conform strictly to the PC Card standard.

Figure 33:
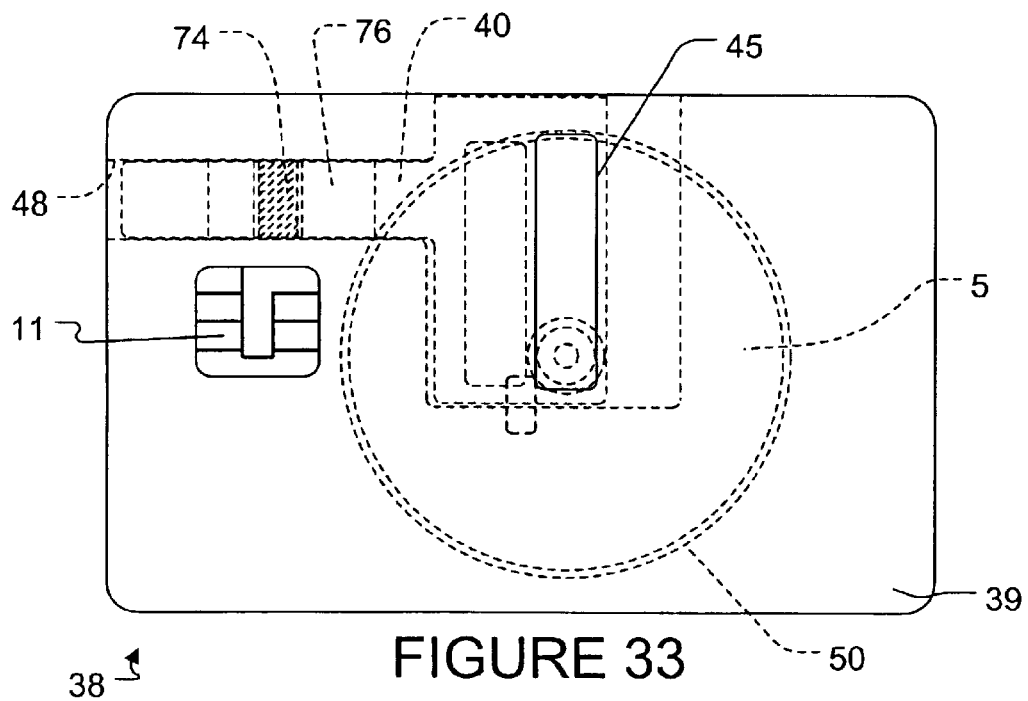
FIG. 33 illustrates the internal details of a card with a magnetically soft material attached to the shutter.
Figure 34:
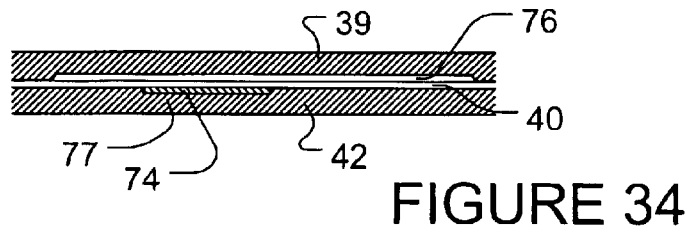
FIG. 34 shows a section view of the card with the shutter and soft magnetic material cavity in the closed position.
Figure 35:
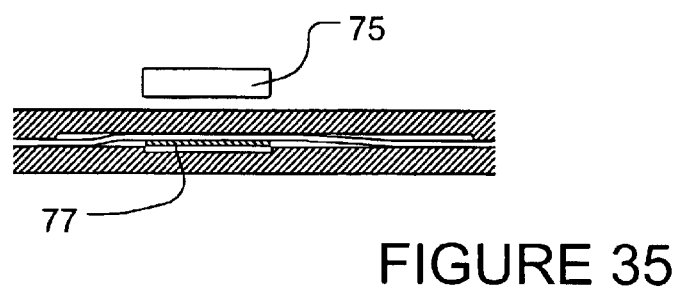
FIG. 35 illustrates in section view, the details of the card with the shutter actuated by a magnet in the reader.
Figure 39:
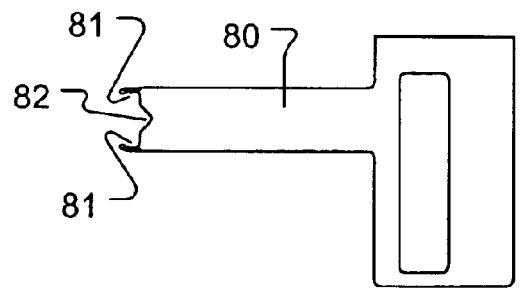
FIG. 39 illustrates details of the shutter.

FIG. 33 illustrates an arrangement for the shutter 40 which enables it to operate within the form of card 38. The cavity 48 where the tab on shutter 40 operates, has an additional step 76 created in the top cover 39. A cavity 77 is also provided in the bottom cover 42. A magnetically soft material 74 is attached to the shutter tab as shown in FIGS. 33 and 34. The flexural rigidity of the shutter 40 is designed to maintain a normally flat configuration. The magnetically soft material 74 is positioned in cavity 77 restricting sliding of the shutter 40. When card 38 is inserted into the reader, a magnet 75 appropriately attached to one of the covers of the reader attracts material 74 allowing it to deflect towards the magnet, as shown in FIG. 35. The movement of material 74 will clear it from the cavity 76, and allow the shutter to move freely in the space 48 and 76 to open access to the recording head and the spindle motor. Upon removal of card 38, the magnet 75 moves the shutter 40 to cover the access port 45 and help preclude contaminants from entering the disk enclosure 50. Normal transportation and handling of the card keeps material 74 in cavity 77. The mass of 74 can be designed along with the magnetic attraction force and the flexural rigidity of the shutter 40 to meet shock and vibration specifications of the card.

FIG. 36 illustrates a card configuration having openings on both the top and the bottom faces of card 78 to allow two sided recording on disk 5. FIG. 37 is a side view of card 78. The access opening and shutter on the back of card 78 are similar and opposed to 45 in the top cover. A two sided arrangement similar to the one shown in FIG. 36 does not have space for a magnetic strip at the back of the card for compatibility with legacy equipment, but there is space for a signature and embossed lettering. FIG. 38 illustrates another configuration with openings 84 on the top and bottom face of the card similar to the card illustrated in FIG. 36, and which also has space for a magnetic strip on the back of the card between lines 94 and 95. Card 78 has integrated circuit chip 11 and a rotating magnetic disk 5. As with other embodiments, this disk rotates in cavity 50 between the top and bottom layers.

In this embodiment the top and bottom layers of card 78 comprise 0.003 inch thick, 300 series stainless steel sheet, while the shutter 80 is 0.0025 inch thick 300 series stainless steel sheet. The surface of the top and bottom sheets, in the area facing the disk, is covered by a fabric liner (not shown). Also the shutter face toward the disk is covered by this fabric liner. The core of the card is 0.023 inch thick PVC plastic sheet. A slot 98, about 0.003 inches deep, is cut in the PVC layer to support the top 96 and bottom 97 surfaces of shutter 80. Other materials such as plastics or metals could also be utilized to construct the various layers of this card.

Figure 40:
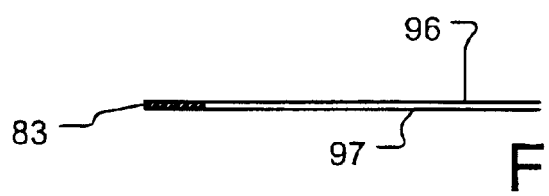
FIG. 40 is a side view of the shutter with top and bottom plates.
Figure 41:
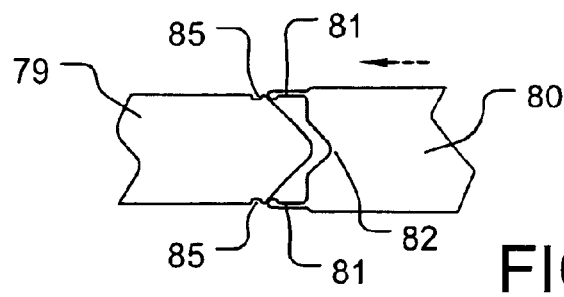
FIG. 41 shows the push-plate and shutter at the start of the actuation cycle to open the access ports on the card.
Figure 42:
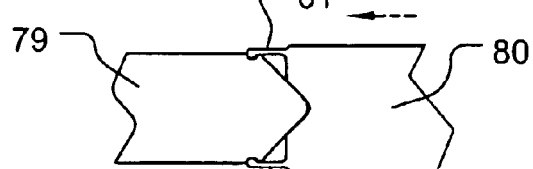
FIG. 42 illustrates the push-plate at the end of the actuation cycle with the shutter latched to the push-plate.
Figure 43:
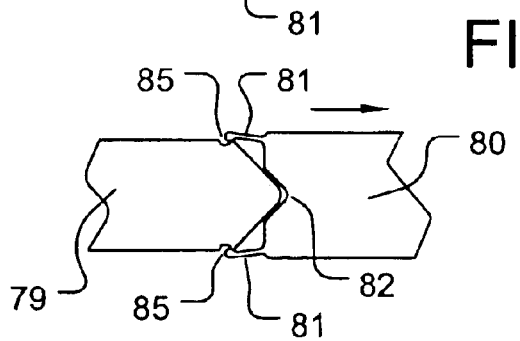
FIG. 43 shows the push-plate when the access ports on the card are closed and the latched condition is disengaged.

A push-plate tab 79 of 0.020 inch thick series 300 stainless steel sheet, attached to the reader mechanism, is aligned with the opening where shutter 80 is housed between the top and bottom layers. The shutter has spring fingers 81 and a shape 82 that matches the shape of the front of push-plate tab 79. A spacer 83, shown in FIG. 40, separates the top 96 and bottom 97 shutters and can move in a cavity created in the PVC layer (not shown), and located between the top and bottom cover plates. The operation of the shutter is illustrated in FIGS. 41, 42 and 43. FIG. 41 shows the condition when card 78 is inserted into the reader and push-plate tab 79 makes contact with shutter 80. Upon further insertion of the card in the reader, shutter 80 is restricted by push-plate tab 79 and the card body moves relative to the shutter until access ports 45, 84 in the top and bottom layers open. Further movement of the card in the reader causes shutter 80 to interfere with edge 99 creating forces that cause the spring fingers 81 to deflect and latch into slots 85 in push-plate tab 79. When the card is ejected or removed from the reader, the latched spring fingers 81 will keep shutter 80 attached to the push-plate tab 79 closing the access ports, 45 and 84, on card 78 until shutter 80 interferes with edge 86 and is forced to move with card 78, as it is removed from the reader. The resulting forces cause spring fingers 81 to deflect, disengaging the latched condition between the push-plate tab 79 and shutter 80.

Figure 44:
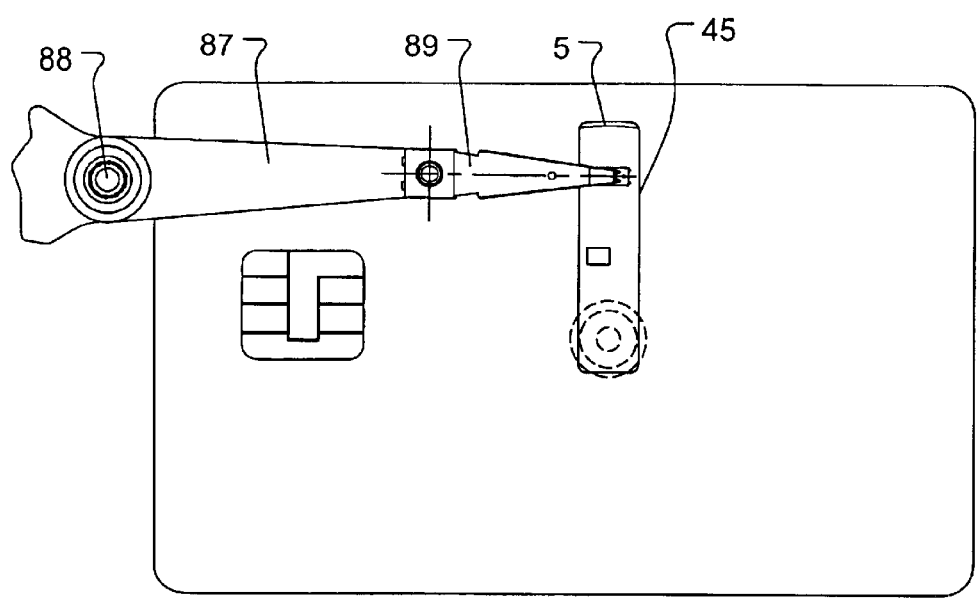
FIG. 44 illustrates a head and rotor assembly for simultaneous two sided recording on the disk.

FIG. 44 is a top view of a head/rotor arrangement allowing two recording heads to be configured in an opposed manner on disk 5. Pivot 88, in this embodiment, is located such that the reader complies with the PCMCIA form factor. The rotor 87 is made longer to position gimbal 89 and the recording head in access port 45. FIG. 45 shows the head arrangement, with disk 5 positioned between the opposed heads 91 and 92. Rotor arms 87 and 90 and gimbals 89 and 91 are configured within the thickness of a PCMCIA Type II card, and arranged in such a manner to operate with needed clearance from the top and bottom surfaces of card 78. In other embodiments of the reader, that do not conform to the PCMCIA form factor, the length of rotor 87 can be reduced.

As discussed above, FIGS. 1 to 38 illustrate preferred embodiments of a card of a format according to ISO standard 7816, wherein, an integrated circuit 11 and a rotating magnetic storage medium 5 are contained within the form of the card. In the embodiment described next, and shown in FIG. 46, cryptography protection is employed. In this situation, integrated circuit 11 preferably includes three functional blocks, authentication 80, RAM 81 and cryptography engine 82. The authentication logic 80 provides two functions, one for controlling the input and output 84 of data to and from integrated circuit 11, and a second for encrypting information, for example a public key encryption algorithm such as RSA, implemented in the integrated circuit 11 itself. The private key for the RSA is stored in RAM 81, along with a digital certificate. RAM 81 is active during authentication of a request to transfer data to or from the card 1. Once authentication is completed successfully, the input data stream is directed to the cryptography engine 82, where an AES algorithm is also implemented in hardware. The keys for this operation are also stored in RAM 81.

Figure 47:
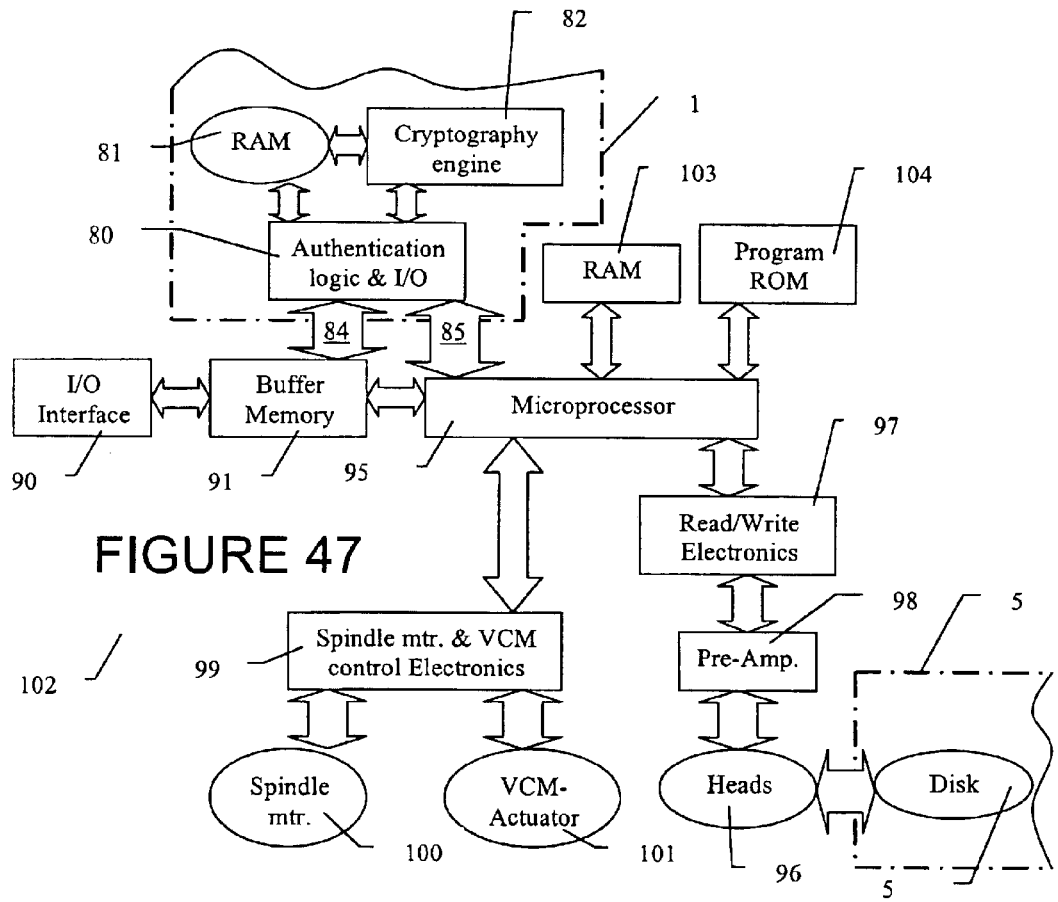
FIG. 47 is a block diagram illustrating the reader electronics and its interface with the card.

Card 1 operates in conjunction with a reader described in copending U.S. patent application Ser. No. 10/193,824, filed on the same date as this application, and entitled "Apparatus for Reading and Writing Cards Having Rotating Memory." This application is incorporated by reference herein. For ease of discussion, however, FIG. 47 illustrates the electronic block diagram for the reader, which includes all components outside dashed lines 1 and 5, and the card 1 of FIG. 1. The reader electronics include the input/output block 90, which contains the protocol for an IDE and/or a PCMCIA interface. Other interfaces, for example, USB or a custom interface configuration may also be employed. Data communicated between the host and the reader is stored in a buffer 91. In a well known manner not further described here, a microprocessor (or digital signal processor) 95 controls the flow of data to the recording heads 96 via the read/write electronics 97 and pre-amplifier drivers 98. The heads 96 read data from and write data to the disk 5. Other electro-mechanical components of the reader include the spindle motor 100 and the voice-coil head positioning actuator 101. These are controlled in a well known manner by microprocessor 95 through the electronics 99. Local RAM 103 is connected to microprocessor 95 to store real time parameters used in the operation of the storage card, such are current cylinder number, track run-out map and other variables. The program memory for microprocessor 95 is contained in ROM 104, preferably a flash memory to allow the control firmware contained in ROM 104 to be updated in the field.

Microprocessor 95 controls the flow of data to authentication block 80 of card 1 and the cryptography engine 82 through path 85. Preferably this communication is by serial interface since ISO 7816 identifies only eight contact points on card 1. The I/O logic in card 1 is selectable to communicate with microprocessor 95 or communicate with standard smart card readers. In this embodiment, the data flow supplied to card 1 occurs prior to the error detection and correction in the reader electronics. Successful decryption of data requires that the data stream be identical to the output data created during encryption, and data read errors must be corrected prior to this operation. Other embodiments allow the data to be directed to the card at other interfaces anywhere between the host interface and the recording head.

Figure 46:
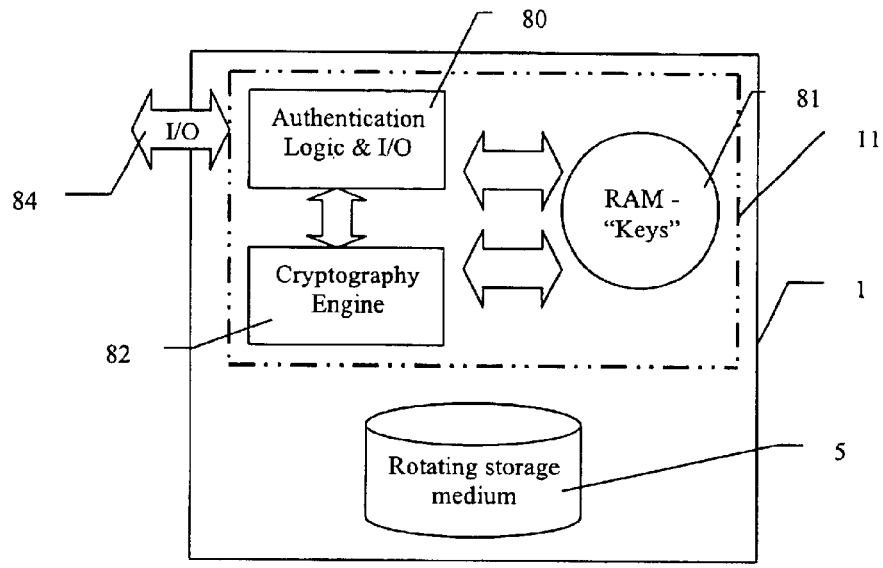
FIG. 46 is a block diagram of a card and integrated circuit affixed to the card.

FIGS. 46 and 47 illustrate a card and reader mechanism where the cryptography logic is attached to card 1 and the rotating magnetic storage volume 5. In other embodiments encryption/decryption is implemented in software on the host system or the reader electronics. One advantage of the described configuration is that encryption algorithms and the storage are independent of the rest of the system. Consequently, new algorithms can be implemented without redesign of other parts of or all of the entire system. Additionally, the illustrated approach allows each card in a family of products to have different algorithms, thereby increasing the security of the data.

A typical application for the encryption discussed above is the secure download of a large data file, such as a movie, music or confidential information. This is described next. Assuming the confidential data file is located on a secure server, the operation of card 1 and reader electronics would entail the following sequence of events. The card reader mechanism is first installed in a system that has a communication channel to the secure server. Card 1 is issued to a user and a private key is stored in RAM 81, along with a digital certificate identifying the owner of the card. In other embodiments, the digital certificate consists of biometric templates encrypted and stored on disk 5.

Once the card 1 is inserted in the reader, a sequence of challenges are initiated between the reader and the card 1, utilizing logic 80, to establish the validity of the card and the reader electronics and second between card 1 and the host system to establish a secure communication channel. Once this is complete, the host system initiates communication with the secure server. The secure server initiates another set of challenges to the card 1. The card responds by sending encrypted messages using the RSA algorithm and the on-board private key. The secure server decrypts the message utilizing the public key assigned to the user of the specific card. A verification of the digital certificate is also performed. Alternatively, in other embodiments, the biometrics of the user are compared to stored templates. After the authentication process is complete, the secure server encrypts a set of session keys (symmetric keys) and information regarding the sequence with which the session keys will be utilized, to encrypt the confidential data. The file is sent to the card 1 utilizing the public key. Note that card 1 is the only card that can decrypt this message.

The session keys are stored in RAM 81 and the input/output logic 80 is configured to pass data to the cryptography engine 82 which performs no operation on the data stream and passes it on to the next logic block. The server then streams the encrypted data to the host system. This data passes through the buffer memory 91, the read/write electronics 97, the preamplifier 98 and is stored on the disk 5. When the transmission is complete, the server terminates the communication link.

At this point, the data stored on disk 5 is encrypted; the keys are in RAM 81, and both must operate together to reveal the stored information. In one embodiment this is achieved by a sequence where logic 80 initiates a challenge using a message encrypted with the private key and requests the host to acknowledge the request to display the data. This challenge and response sequence also establish the validity of the communication link to enable display of the data. Upon completion of this sequence the reader mechanism directs the data from disk 5 through the cryptography engine 82 where the cipher text is converted to data which is then passed on to the host system.

In an alternative method the data is transmitted encrypted from card 1 along with the encryption keys to the host in a manner similar to the secure server communication described earlier. This sequence requires that the host have a microprocessor. In this arrangement card 1 also contains the cryptography logic as software stored on disk 5. This logic is itself securely transmitted to the host and used to perform the decryption of the data. For hosts that do not have computational capability, preferably the decryption is performed by logic 82 on card 1 and delivered to the host.

Figure 48:
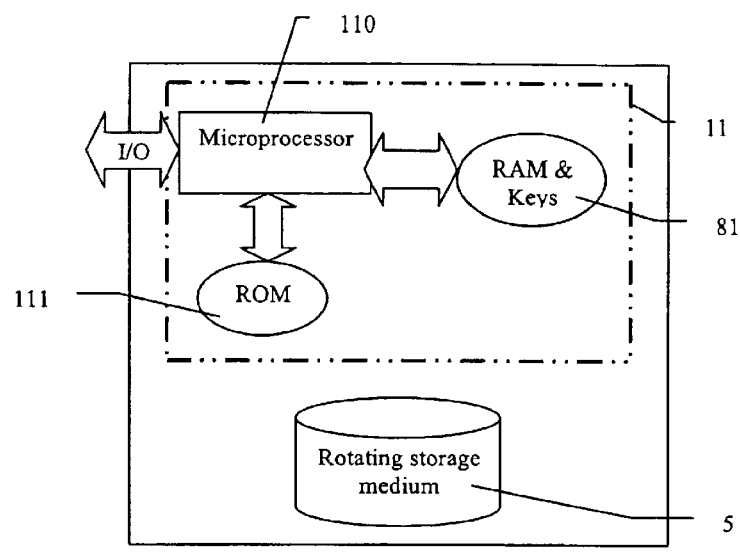
FIG. 48 is a block diagram of another embodiment of a card and integrated circuit affixed to the card.

FIG. 48 illustrates another embodiment of the card 1. In this arrangement microprocessor 110 is included in the card, together with RAM 81, program ROM 111, and the rotating storage medium 5. In addition to a DSP, the microprocessor 110 can also be implemented as a state machine operating under control of microprocessor 95 in the reader (see FIG. 47). The cryptography engine in this implementation includes microprocessor 110 and the control program is stored in ROM 111. A feature of this arrangement is that RAM 81 can be utilized as a special buffer for disk 5. This enables the card 1 to be legacy compatible as all communication is between the microprocessor 110, RAM 81 and the external system through the contacts on the integrated circuit 11. Operation in this manner allows the card to be utilized with legacy Smart Card readers.

Figure 49:
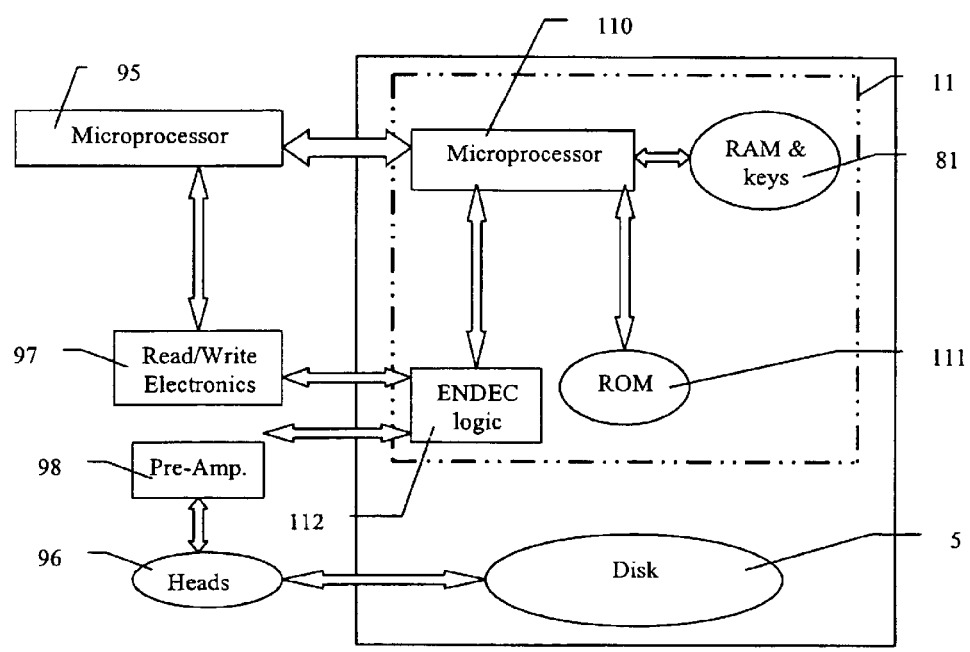
FIG. 49 is a block diagram of a further embodiment of a card and integrated circuit affixed to the card.

In another embodiment card 1, as shown in FIG. 49, is configured as a server, where the control program for microprocessor 110 contained in ROM 111 allows it to fetch data and files from the storage volume 5. Additionally, the fetched program can also include security firmware to create a firewall with client authentication prior to any data access from disk 5. Of course in other embodiments, microprocessors 110 and 95 can be configured to provide other programmable features.

In another embodiment illustrated in FIG. 49, card 1 is configured with a microprocessor 110, RAM 81, program ROM 111, disk 5, and an encoder/decoder (ENDEC) 112. The ENDEC 112 which implements the encode/decode logic utilized in the read/write electronics of the reader. In this configuration read/write block 97 in the reader does not include the encode/decode functions and this is performed with logic on the card. The information flow is then from the card, to preamplifier 98, and then to the recording heads 96.

In other embodiments ENDEC 112 consists of a simple switch controlled by microprocessor 110 or as a state machine implemented on the card. One advantage of this approach is that access to disk 5 can be controlled and limited to a certain number of times, after which the switch in the card can be disabled. This allows for "limited" use of the card data, beyond which it is not accessible. In still further embodiments, the ENDEC 112 logic allows the removable card to carry encode/decode information for a PRML coding scheme where the parameters can be specific for one card and different from those used in another card.

In another embodiment illustrated in FIG. 50, the integrated circuit 11 includes the functional blocks of authentication logic 80 using public key cryptography, block encryption logic 82 implementing in hardware algorithms such as DES, Triple DES or AES, error detection and correction logic 117, data encode and decode logic 112, a local operating system 106 such as JAVA, MULTOS or others, and input/output logic 105. In this implementation, integrated circuit 11 communicates via an eight pin interface 87 labeled "A" per ISO standard 7816-2 and -3. This interface, as presently defined, has two unused pins #4 and #8, these are labeled "B" and form a serial bi-directional interface 88. The storage volume 5 in one embodiment is partitioned into multiple sub-volumes 113, 114, 115 and 116. Other embodiments include a single partition or many more such partitions with each partition having a unique security code. Access to data in a specific sub-volume can be conditional upon receiving the required information from the host or client requesting the data. In this situation, buffer memory 91 and microprocessor 95 communicate with integrated circuit 11 via contact pin numbers 1, 2, 3, 4, 5 and 6. Pin #8 is connected to the read/write electronics 97, to form the bi-directional serial interface "B" 88. The data from read/write electronics 97 is directed to the recording head 96 and magnetic flux transitions are recorded on disk 5 via a non-contact interface 86 between the recording head 96 and the rotating disk 5, as described earlier herein. In this situation the data path from the host 89 passes through the PCMCIA/ATA interface 90 and the buffer memory 91 to the serial interface "B" pin #4. This data is directed through the block cryptography hardware 82 located in integrated circuit 11 on the card. This block can be set to be activated to encrypt this information or to merely pass this information on to the error detection and correction logic 117 depending upon the set-up conditions established by microprocessor 95 or the local operating system 106. The data is then processed to develop syndromes for suitable error detection and recovery and then coded. In one embodiment, the coding utilizes PRML coding in encode/decode 112 prior to being passed on the read/write electronics 97. The file operating system preferably resides on disk 5 and can be controlled by the local operating system 106 or downloaded to the host 89 upon authentication by logic 81.

On the return path, magnetic flux transitions recorded on the disk 5 surface create electrical signals in the recording head 96 that are then amplified by the read/write electronics 97. Then they are passed to the encode/decode logic 112. The data is processed by logic 117, to detect and correct any read errors, all prior to being decrypted by the cryptography engine 82. This data can then be delivered to the host 89 through the buffer memory 91 and the interface controller 90. Of course, the integrated circuit 11 can be configured in other ways to provide other functionality depending upon the users preferences.

The preceding description has described the structure of a card utilizing a Mylar or flexible metal rotating disk in which the card conforms to the ISO 7816 standard. Other card configurations are also possible that utilize a conventional floppy disk of similar diameter or which employ an optical tape medium. The magnetic disk, once assembled in the card, can be servowritten to establish the data tracks and record position feedback information for servo tracking. Additionally, the data tracks can be formatted and defect mapped, and if desired proprietary or other software can be loaded onto various tracks. The procedures and equipment required to achieve these results are similar to that utilized by the industry in the construction of hard disk and ZIP disk drives.

The following claims define the scope of the invention. What is claimed is:

1. A flexible card no larger than a credit card for storing data comprising:
    a first layer;
    a rotatable magnetic disk for storing the data;
    a second layer affixed to the first layer, the second layer and the first layer together surrounding the magnetic disk;
    a first opening in the first layer to allow access for reading the data on the magnetic disk;
    a third layer disposed between the first and the second layers; and
    a shutter movably attached to the card for covering the first opening when data on the card is not being accessed;
    wherein the shutter is disposed to cover the first opening when the shutter is closed, and to expose the first opening when the shutter is open, the first layer includes a recess within which the shutter may slide, and the shutter slidably covers the first opening when the shutter is closed.

2. A card as in claim 1 further comprising a third layer disposed between the first and the second layers.

3. A card as in claim 1 further comprising a hub affixed to the magnetic disk for enabling coupling of the magnetic disk to an external motor for rotating the disk.

4. A card as in claim 3 wherein the card further comprises a second opening in the second layer to expose a portion of the hub to enable the external motor to rotate the magnetic disk.

5. A card as in claim 1 further comprising a further opening in the second layer, the further opening together with the first opening allowing access for reading data on opposite sides of the magnetic disk.

6. A card as in claim 5 wherein a shutter is disposed to cover the first and the further openings.

7. A card as in claim 6 wherein the shutter when closed forms a labyrinth seal to protect the magnetic disk from ambient conditions.

8. A card as in claim 1 wherein the shutter is disposed to cover the first opening when the shutter is closed, and to expose the first opening when the shutter is open.

9. A card as in claim 1 wherein the recess in the first layer is elongated and wherein a portion of the shutter slides in the elongated portion.

10. A card as in claim 9 wherein the elongated recess extends to an edge of the card to enable an external device to open the shutter.

11. A card as in claim 1 wherein the magnetic disk comprises one of a plastic substrate and a flexible metal.

12. A card as in claim 11 wherein the first layer comprises stainless steel and the second layer comprises plastic.

13. A card as in claim 12 wherein the stainless steel is about 0.005 inches thick and the plastic is about 0.03 inches thick.

14. A card as in claim 1 wherein the second layer comprises stainless steel.

15. A card as in claim 1 further comprising an integrated circuit attached to the card.

16. A card as in claim 1 further comprising:
    an additional opening in the first layer; and
    wherein the integrated circuit is affixed to the card to allow one surface of the integrated circuit to extend through the opening in the first layer.

17. A card as in claim 1 further comprising:
    identification information affixed to the first layer; and
    a magnetic strip affixed to the second layer.

18. A card as in claim 1 wherein the card may be deformed without damage about 2 centimeters in a lengthwise direction and about 1 centimeter in a widthwise direction.

19. A card as in claim 1 further comprising:
    a hub affixed to the magnetic disk on both sides of the disk, the hub containing an opening therein for engaging with a motor; and
    wherein the card deforms when inserted into a reader in an amount sufficient to allow the hub to engage the motor.

20. A card as in claim 1 further comprising liner material disposed between the first and second layers to separate the magnetic disk from contact with them.

21. A card as in claim 1 wherein the shutter is disposed in a recess between the first layer and the second layer.

22. A card as in claim 21 wherein the recess extends to an edge of the card to enable an external mechanism to open and close the shutter.

23. A card as in claim 22 further comprising a latch to hold the shutter closed when the external mechanism is not engaged.

24. A card as in claim 22 wherein a portion of the shutter includes a magnet, and the external mechanism opens the shutter using the magnet.

25. A credit card sized card comprising:
- a rotating magnetic memory inside the credit card for storing information; and
- an integrated circuit accessible from the exterior of the card.

26. A card as in claim 25 further comprising an encryption system implemented in the integrated circuit.

27. A card as in claim 26 wherein the integrated circuit further comprises:
- a cryptography engine;
- a memory for storing keys; and
- an input/output port for being connected to an external system.

28. A card as in claim 27 wherein at a time the card is coupled to an external system, data is transferred to and from the card only if the card has a proper key recognized by the external system.

29. A card as in claim 28 wherein the data is stored on the card in an encrypted format.

30. A card as in claim 29 wherein the data is provided by the card to the external system in an encrypted format.

31. A card as in claim 27 further comprising a microprocessor incorporated therein.

32. A card as in claim 31 wherein the microprocessor is used to control an external system which does at least one of reading from and writing to the rotating magnetic memory.

33. A card as in claim 25 having a width, a length and a dimension perpendicular thereto, wherein the card is flexible such that its center may be displaced in the perpendicular dimension at least 10 percent of its length.

34. A card as in claim 25 having a width, a length and a dimension perpendicular thereto, wherein the card is flexible such that its center may be displaced in the perpendicular dimension at least 5 percent of its width.

35. A flexible card no larger than a credit card for storing data comprising:
- a first layer;
- a rotatable magnetic disk for storing the data;
- a second layer affixed to the first layer, the second layer and the first layer together surrounding the magnetic disk; and
- a first opening in the first layer to allow access for reading the data on the magnetic disk; and
- an integrated circuit attached to the card.

36. A card as in claim 35 further comprising an additional opening in the first layer, wherein the integrated circuit is affixed to the card to allow one surface of the integrated circuit to extend through the additional opening in the first layer.

37. A flexible card no larger than a credit card for storing data comprising:
- a first layer;
- a rotatable magnetic disk for storing the data;
- a second layer affixed to the first layer, the second layer and the first layer together surrounding the magnetic disk;
- a first opening in the first layer to allow access for reading the data on the magnetic disk;
- a third layer disposed between the first and the second layers;
- a shutter operable by an external mechanism, the shutter disposed in a recess extending to an edge of the card between the first layer and the second layer and movably attached to the card for covering the first opening when data on the card is not being accessed; and
- a latch to hold the shutter closed when the external mechanism is not engaged.

* * * * *